(12) United States Patent
Kobayashi et al.

(10) Patent No.: US 10,250,767 B2
(45) Date of Patent: Apr. 2, 2019

(54) IMAGE FORMING APPARATUS CALCULATING MOVEMENT OF RECORDING MEDIUM

(71) Applicant: Konica Minolta, Inc., Chiyoda-ku, Tokyo (JP)

(72) Inventors: Yuji Kobayashi, Toyohashi (JP); Takaki Kato, Toyoake (JP); Masayuki Fukunaga, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/830,400

(22) Filed: Dec. 4, 2017

(65) Prior Publication Data
US 2018/0157941 A1  Jun. 7, 2018

(30) Foreign Application Priority Data
Dec. 6, 2016  (JP) .................................. 2016-236774

(51) Int. Cl.
*H04N 1/00*   (2006.01)
*G06K 15/12*  (2006.01)
*G06K 15/16*  (2006.01)

(52) U.S. Cl.
CPC ..... *H04N 1/00652* (2013.01); *G06K 15/1219* (2013.01); *G06K 15/16* (2013.01); *H04N 1/00594* (2013.01); *H04N 1/00602* (2013.01)

(58) Field of Classification Search
None
See application file for complete search history.

(56) References Cited

U.S. PATENT DOCUMENTS

2017/0094071 A1\* 3/2017 Kato ...................... G06T 7/262

FOREIGN PATENT DOCUMENTS

| JP | 2010-134190 A | 6/2010 |
| JP | 2011-207547 A | 10/2011 |
| JP | 2011-213463 A | 10/2011 |

\* cited by examiner

*Primary Examiner* — Scott A Rogers
(74) *Attorney, Agent, or Firm* — Buchana Ingersoll & Rooney PC

(57) ABSTRACT

An image forming apparatus includes: a conveying path on which a recording medium is conveyed; an image capturer that includes a light source and radiates light from the light source to capture the recording medium being conveyed at different timings to generate at least two images including a first image and a second image; and a movement amount calculator that calculates a movement amount of the recording medium between capturing timings of the first and second images, wherein the movement amount calculator: calculates an index distance which is a distance in a conveying direction of a pattern formed by reflected light from the recording medium; calculates a ratio between the index distance and a reference distance used for comparison with the index distance; and calculates a movement amount of the recording medium between the capturing timings of the first and second images.

10 Claims, 15 Drawing Sheets

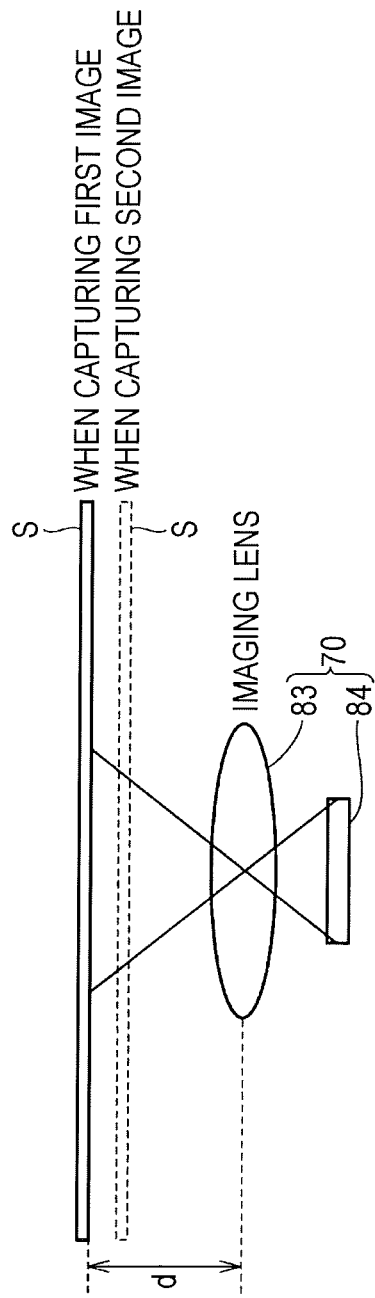

IMAGE FORMING APPARATUS CALCULATING MOVEMENT OF RECORDING MEDIUM

The entire disclosure of Japanese patent Application No. 2016-236774, filed on Dec. 6, 2016, is incorporated herein by reference in its entirety.

BACKGROUND

Technological Field

This disclosure relates to an image forming apparatus and, more particularly, to a technique for sensing a conveying speed of a recording medium in an image forming apparatus.

Description of the Related Art

Conventionally, a device for measuring the speed of a moving object in a non-contact manner is used for various types of products. For example, some image forming apparatuses, such as a multi-functional peripheral (MFP), include an image pickup element that picks up an image of a conveying path to specify the conveying speed of a recording medium from the image picked up by the image pickup element. For example, JP 2010-134190 A discloses a technique for specifying the conveying speed of a recording medium by processing each of two or more images picked up with respect to a certain recording medium using Fourier transform.

Meanwhile, JP 2011-213463 A and JP 2011-207547 A disclose a technique for specifying the conveying speed by capturing two images of a recording medium being conveyed at different timings and performing pattern matching on the two picked-up images.

For example, a movement amount detection device disclosed in JP 2011-207547 A discloses a configuration including a first illuminator 10 and a second illuminator 11, in which a set of images having a relationship with a higher degree of similarity among the similarity between first images captured by the first illuminator 10 and the similarity between second images captured by the second illuminator 11 is used to detect the movement amount of a print medium P (refer to "Abstract").

However, the technique for obtaining the conveying speed of the recording medium by pattern matching as in JP 2011-213463 A and JP 2011-207547 A is easy to erroneously detect the moving destination due to a lot of similar patterns on the surface of the recording medium.

In addition, since the movement amount detection device disclosed in JP 2011-207547 A requires a plurality of light sources for calculating the movement amount, the production cost of the movement amount detection device increases.

Although the technique disclosed in JP 2010-134190 A can suppress erroneous detection of the moving destination of the moving object as described above, an error in the calculated conveying speed of the recording medium could increase, for example, in a case where the recording medium is inclined with respect to a conveying path. Therefore, there is a need for a technique capable of more accurately obtaining the movement amount of a moving object.

SUMMARY

The present disclosure has been made to solve the above-described problems and an object of one aspect is to provide an image forming apparatus capable of more accurately obtaining a conveying speed of a recording medium being conveyed than in the past.

To achieve the abovementioned object, according to an aspect of the present invention, an image forming apparatus reflecting one aspect of the present invention comprises: a conveying path on which a recording medium is conveyed; an image capturer that includes a light source and radiates light from the light source to capture the recording medium being conveyed at different timings to generate at least two images including a first image and a second image; and a movement amount calculator that calculates a movement amount of the recording medium between capturing timings of the first and second images, wherein the movement amount calculator: calculates an index distance which is a distance in a conveying direction of a pattern formed by reflected light from the recording medium based on at least one image out of the first and second images; calculates a ratio between the index distance and a reference distance used for comparison with the index distance; and calculates a movement amount of the recording medium between the capturing timings of the first and second images based on the ratio, the first image, and the second image.

BRIEF DESCRIPTION OF THE DRAWINGS

The objects, advantages, aspects, and features provided by one or more embodiments of the invention will become more fully understood from the detailed description given hereinbelow and the appended drawings which are given by way of illustration only, and thus are not intended as a definition of the limits of the present invention:

FIG. 16 is a diagram illustrating how a distance between the sheet and a lens varies.

DETAILED DESCRIPTION OF EMBODIMENTS

Figure 1:
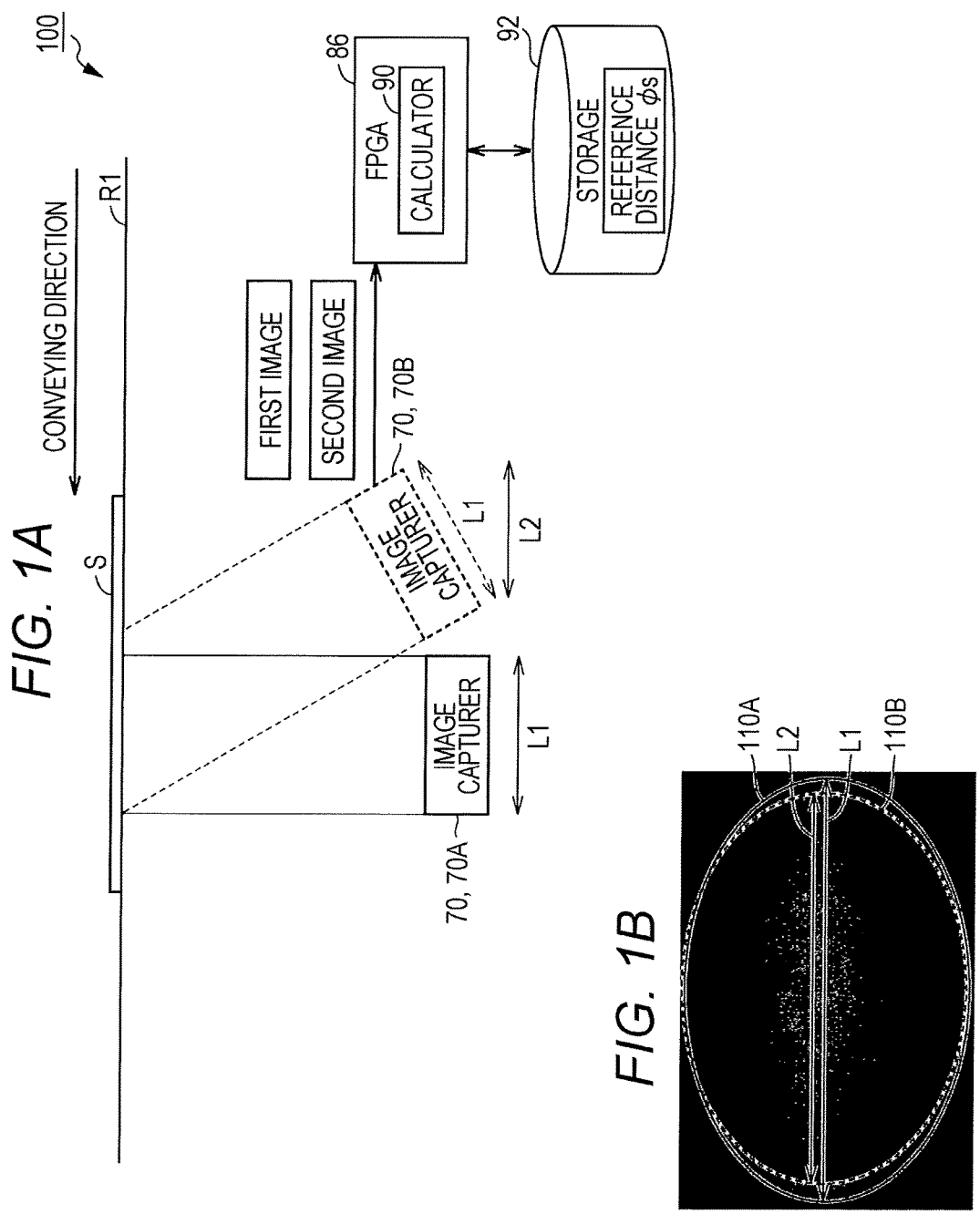
FIGS. 1A and 1B are conceptual diagrams schematically illustrating a method of calculating a conveying speed of a recording medium according to an embodiment.

Hereinafter, one or more embodiments of the present invention will be described in detail with reference to the drawings. However, the scope of the invention is not limited to the disclosed embodiments. In the following description, the same members are denoted by the same reference numerals. The names and functions thereof are also the same. Therefore, detailed description thereof will not be repeated. Note that the respective embodiments and configurations described below may be selectively combined as appropriate.

(Technical Thought)

FIGS. 1A and 1B are conceptual diagrams schematically illustrating a method of calculating a conveying speed of a recording medium according to an embodiment. Referring to FIG. 1A, an image forming apparatus 100 according to an embodiment has a conveying path R1, an image capturer 70, and a field-programmable gate array (FPGA) 86. A sheet S as a recording medium is being conveyed on the conveying path R1.

The image capturer 70 captures an image of the sheet S being conveyed at different timings to generate at least two images including a first image and a second image and outputs the generated images to the FPGA 86.

A calculator 90 of the FPGA 86 calculates a movement amount of the sheet S between the capturing timings of the first and second images based on these two images.

However, when the positional relationship between the image capturer 70 and the sheet S varies, it could become difficult to precisely calculate the movement amount of this sheet S.

It is assumed that, at the time of manufacturing the image forming apparatus 100, the image capturer 70 is attached at a position of a state 70A represented by a solid line. It is assumed that the image capturer 70 and the conveying path R1 are parallel in this state.

The image capturer 70 irradiates the sheet S with laser light from a laser light source 81 to be described later and detects reflected light from the sheet S. In one aspect, it is assumed that an aperture (not illustrated) of the laser light source 81 has an elliptical shape extending in a conveying direction. In this case, the image capturer 70 in the state 70A detects a speckle pattern 110A indicated by a solid line in FIG. 1B. The length of this speckle pattern 110A in the conveying direction, that is, the major axis is a length L1.

It is assumed that, by use of the image forming apparatus 100, the image capturer 70 has moved to a position of a state 70B represented by a broken line. As a result, the image capturer 70 in the state 70B and the conveying path R1 are no longer parallel.

The image capturer 70 in the state 70B detects a speckle pattern 110B indicated by a broken line in FIG. 1B. The major axis of this speckle pattern 110B is a length L2.

As illustrated in FIG. 1B, the length L2 of the speckle pattern 110B in the conveying direction is shorter than the length L1 of the speckle pattern 110A in the conveying direction. This is because the image capturer 70 (a sensor surface of a two-dimensional sensor included therein) in the state 70B and the conveying direction of the sheet S are not parallel and thus, the speckle pattern captured by the image capturer 70 in the state 70B is reduced in size in the conveying direction than the actual speckle pattern.

Accordingly, when the movement amount of the sheet S is calculated based on the first image and the second image captured by the image capturer 70 in the state 70B, the FPGA 86 calculates a movement amount smaller than the actual movement amount.

Note that the aspect in which the image capturer 70 and the sheet S are not parallel is not limited to the aspect in which the image capturer 70 is inclined as in the state 70B. In another aspect, the sheet S can be inclined with respect to the conveying path R1. Also in such an aspect, the image capturerer 70 and the sheet S are not parallel and the speckle pattern captured by the image capturer 70 can be reduced in size in the conveying direction than the actual speckle pattern.

The image forming apparatus 100 according to an embodiment can solve such disadvantages. The image forming apparatus 100 according to the embodiment measures the length L1 in the conveying direction of the speckle pattern 110A captured by the image capturer 70 in the state 70A and stores the measured length L1 to a storage 92 as a reference distance $\phi s$.

The calculator 90 according to the embodiment measures an index distance $\phi 1$, which is a distance (L2) in the conveying direction in the speckle pattern 110B, based on at least one image out of the first image and the second image captured by the image capturer 70 in the state 70B.

The calculator 90 calculates a ratio of the reference distance $\phi s$ to the index distance $\phi 1$. The calculator 90 calculates a temporary movement amount of the sheet S based on the first image and the second image captured by the image capturer 70 in the state 70B. The calculator 90 corrects this temporary movement amount using the above ratio and settles the movement amount of the sheet S.

According to the above configuration, the image forming apparatus 100 according to the embodiment can precisely calculate the movement amount of the sheet S even when the positional relationship between the image capturer 70 (the sensor surface of the two-dimensional sensor included therein) and the sheet S is altered. A specific configuration and control of the image forming apparatus 100 that can realize such control will be described below.

First Embodiment (Configuration of Image Forming Apparatus 100)

Figure 2:
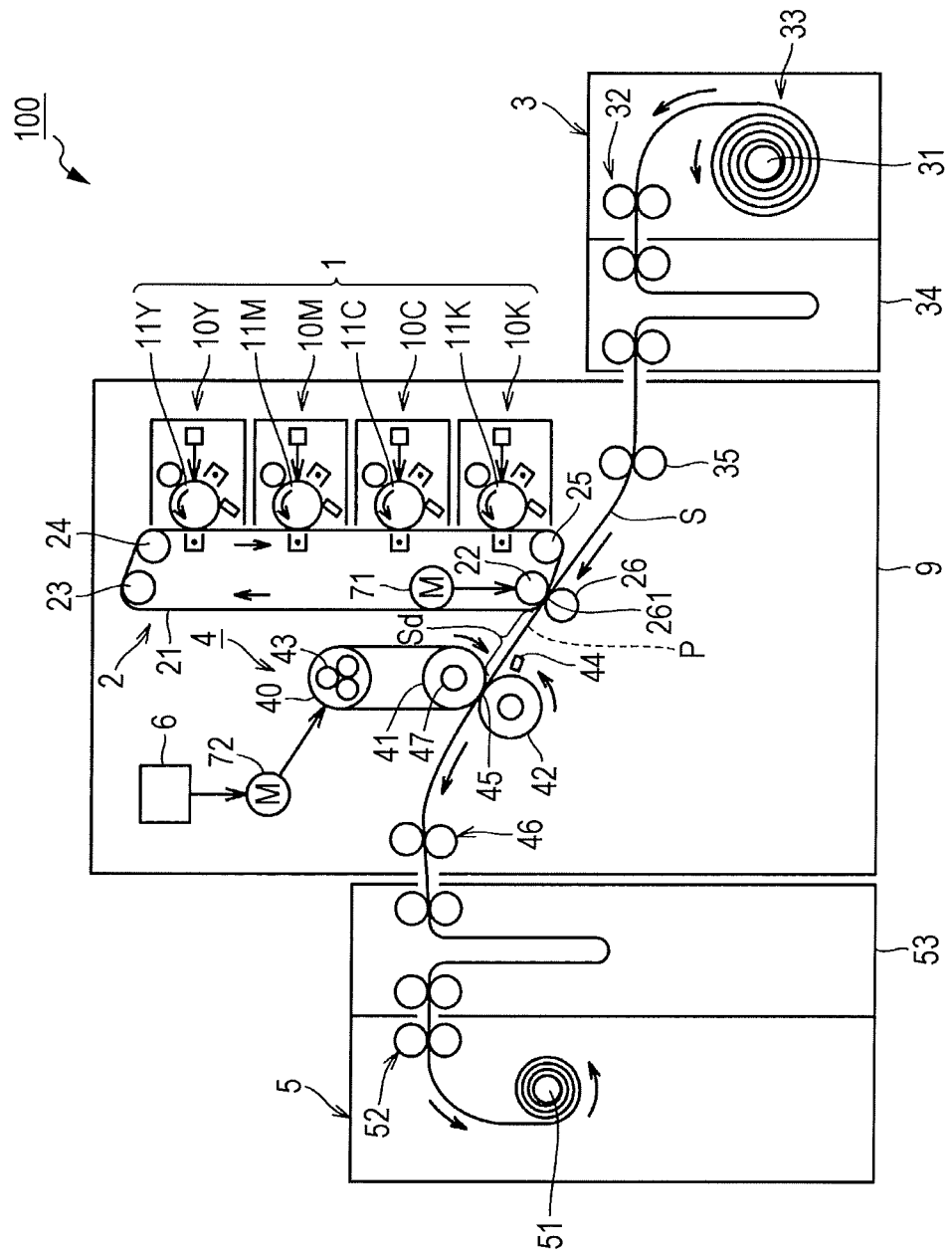
FIG. 2 is a diagram for explaining a configuration example of an image forming apparatus.

FIG. 2 is a diagram for explaining a configuration example of the image forming apparatus 100. FIG. 2 illustrates the image forming apparatus 100 as a color printer. The image forming apparatus 100 as a color printer will be described hereinafter, but the image forming apparatus 100 is not limited to a color printer. For example, the image forming apparatus 100 may be a monochrome printer, or may be a multi-functional peripheral (MFP) including a monochrome printer, a color printer, and a FAX.

As illustrated in FIG. 2, the image forming apparatus 100 includes an image former 1, an intermediate transferer 2, a sheet supplier 3, a fixing device 4, a sheet winder 5, a controller 6, and the like. The image forming apparatus 100 is connected to a network (for example, a local area network (LAN)) and, when accepting an instruction to execute a printing job from an external terminal device (not illustrated), forms a color image of yellow (Y), magenta (M), cyan (C), and black (K) colors based on the instruction.

The image former 1 includes imaging units 10Y to 10K corresponding to Y to K colors, respectively. The imaging unit 10Y charges a surface of a photosensitive drum 11Y rotating at a constant speed. When an electrostatic latent image is formed on the charged photosensitive drum 11Y by exposure scanning on an exposed area, this electrostatic latent image is developed with toner of Y color and a developed Y color toner image is primarily transferred onto an intermediate transfer belt 21 in an electrostatic manner.

The other imaging units 10M, 10C, and 10K also execute the respective processes of charging, exposure, development, and primary transfer similar to those of the imaging unit 10Y and primarily transfer an M color toner image on a photosensitive drum 11M, a C color toner image on a photosensitive drum 11C, and a K color toner image on a photosensitive drum 11K, respectively, onto the intermediate transfer belt 21. In FIG. 2, formation timings of the toner images of Y to K colors are set such that the toner images of Y to K colors representing an original image of one page are multiply transferred on the intermediate transfer belt 21. These formation timings are set in accordance with the surface speed of the intermediate transfer belt 21. The surface speed of the intermediate transfer belt 21 is defined by the rotation speed of a driving roller 22 that stretches the intermediate transfer belt 21. Accordingly, it is required to grasp the precise rotation speed of the driving roller 22 (in other words, the conveying speed of the sheet S at a downstream area of the driving roller 22). The reason is that, when the rotation speed of the driving roller 22 is erroneously sensed, the timings of superimposing the toner images of Y to K colors are out of sync and color misregistration occurs in the sheet S (recording medium).

The intermediate transferer 2 includes the intermediate transfer belt 21, the driving roller 22 and driven rollers 23, 24, and 25 that stretch the intermediate transfer belt 21, a secondary transfer roller 26, and the like.

The driving roller 22 is rotated by a rotational driving force of a belt motor 71 and causes the intermediate transfer belt 21 to circulate in a direction indicated by arrows in FIG. 2. The belt motor 71 is constituted by, for example, a direct current (DC) brushless motor. The driven rollers 23, 24, and 25 are driven to rotate as the intermediate transfer belt 21 circulates.

During the circulation of the intermediate transfer belt 21, the toner images of Y to K colors formed by the imaging units 10Y to 10K are multiply transferred onto a circumferential surface of the intermediate transfer belt 21.

The toner images of Y to K colors multiply transferred onto the intermediate transfer belt 21 are conveyed by the circulation of the intermediate transfer belt 21 toward the secondary transfer roller 26 arranged so as to oppose the driving roller 22 with the intermediate transfer belt 21 interposed therebetween.

The secondary transfer roller 26 is in contact with the circumferential surface of the intermediate transfer belt 21 at a secondary transfer position 261 of the intermediate transfer belt 21 and is driven to rotate as the intermediate transfer belt 21 circulates.

The sheet supplier 3 sends the elongated sheet S from a roll sheet 33 wound around a rotation shaft 31 to a paper feed adjuster 34 via a supply roller 32. The paper feed adjuster 34 conveys the sheet S from the supply roller 32 toward a conveying roller 35 of a main body 9 of the image forming apparatus 100. The paper feed adjuster 34 holds the elongated sheet S in a slackened state so as to absorb a difference in speed between the conveying speed of the sheet S sent out from the roll sheet 33 in the sheet supplier 3 and the conveying speed of the sheet S in the main body 9, thereby adjusting the feeding of the sheet S to the main body 9. In addition, not only plain paper but also label paper, for example, may be used as the sheet S in some cases.

The sheet S supplied to the conveying roller 35 is wound up by a winding roller 51 via the secondary transfer position 261, the fixing device 4, a discharge roller 46, a paper discharge adjuster 53 of the sheet winder 5, and a conveying roller 52. The paper discharge adjuster 53 holds the elongated sheet S in a slackened state so as to absorb a difference in speed between the conveying speed of the sheet S in the main body 9 and the conveying speed of the sheet S by the winding roller 51 of the sheet winder 5, thereby adjusting the discharge of the sheet S from the main body 9.

During the winding of the sheet S, the toner images of Y to K colors multiply transferred onto the intermediate transfer belt 21 are secondarily transferred by the secondary transfer roller 26 in an electrostatic manner collectively on a front side surface of the sheet S passing through the secondary transfer position 261 (that is, a side in contact with the intermediate transfer belt 21). In a case where a plurality of pages of toner images are formed on the intermediate transfer belt 21 at a constant interval in a belt circulation direction, the toner images of respective pages are secondarily transferred onto the sheet S one by one in order while the elongated sheet S passes through the secondary transfer position 261. The toner image of each page secondarily transferred onto the sheet S is conveyed to the fixing device 4 together with the sheet S being wound.

The fixing device 4 includes a heating roller 40 in a cylindrical shape having a heater 43 inserted therein, a fixing roller 41 in a cylindrical shape, and a pressure roller 42 brought into pressure contact with the fixing roller 41 with a predetermined pressure at a nip area 45 with the fixing roller 41. The fixing device 4 makes the heating roller 40 hot by heating the heater 43 to a predetermined temperature. As the heating roller 40 rotates, heat is transferred to the nip area 45 between the fixing roller 41 and the pressure roller 42. The fixing device 4 maintains the temperature of the nip area 45 at a temperature necessary for fixing the toner (for example, 150° C.).

The fixing roller 41 is driven in a direction of an arrow in FIG. 2 by a fixing motor 72 constituted by a DC brushless motor and rotates about a rotation shaft 47. Note that the heating roller 40 may drivingly rotate instead of the fixing roller 41. The pressure roller 42 is driven to rotate by the fixing roller 41. The fixing roller 41 and the pressure roller 42 pinch the sheet S to convey and at the same time thermally fix the toner image on the front side of the sheet S by heating and pressurizing while this toner image after the secondary transfer onto the sheet S passes through the nip area 45.

The sheet S being wound is conveyed across the fixing roller 41 and the secondary transfer roller 26. When a sheet area Sd of the sheet S located between the fixing roller 41 and the secondary transfer roller 26 slackens during this conveyance, wrinkles sometimes occur in the sheet S at the nip area 45.

Therefore, in order to prevent the occurrence of wrinkles on the sheet S, a certain degree of tension acts on the sheet area Sd in a sheet conveying direction. This tension is generated, for example, by driving the rotation speed of the fixing roller 41 faster by a constant value than the rotation speed of the secondary transfer roller 26.

The conveying speed of the sheet S is sensed by a sensor unit 44. The sensor unit 44 is disposed at a position in the vicinity of the nip area 45 on an upstream side of the nip area 45 in the sheet conveying direction and on a lower side of a position P in the conveying path R1 of the sheet S. The sensor unit 44 measures the conveying speed of a back side surface of the sheet S pinched and conveyed by the fixing roller 41 and the pressure roller 42 (that is, a side on which the toner image is not transferred). The sensor unit 44 measures the conveying speed of the sheet surface at a constant interval (for example, every 1 ms) during the conveyance of the sheet S and sends a result of the measurement to the controller 6.

Note that, in the example illustrated in FIG. 2, the sensor unit 44 is arranged between the secondary transfer roller 26 and the fixing device 4, but the arrangement position of the sensor unit 44 is not limited thereto. For example, the sensor unit 44 may be arranged between the conveying roller 35 and the secondary transfer roller 26, or may be arranged on an upstream side of the conveying roller 35. In addition, a configuration including a plurality of sensor units 44 arranged in the image forming apparatus 100 may be employed.

(Configuration of Sensor Unit 44)

Figure 3:
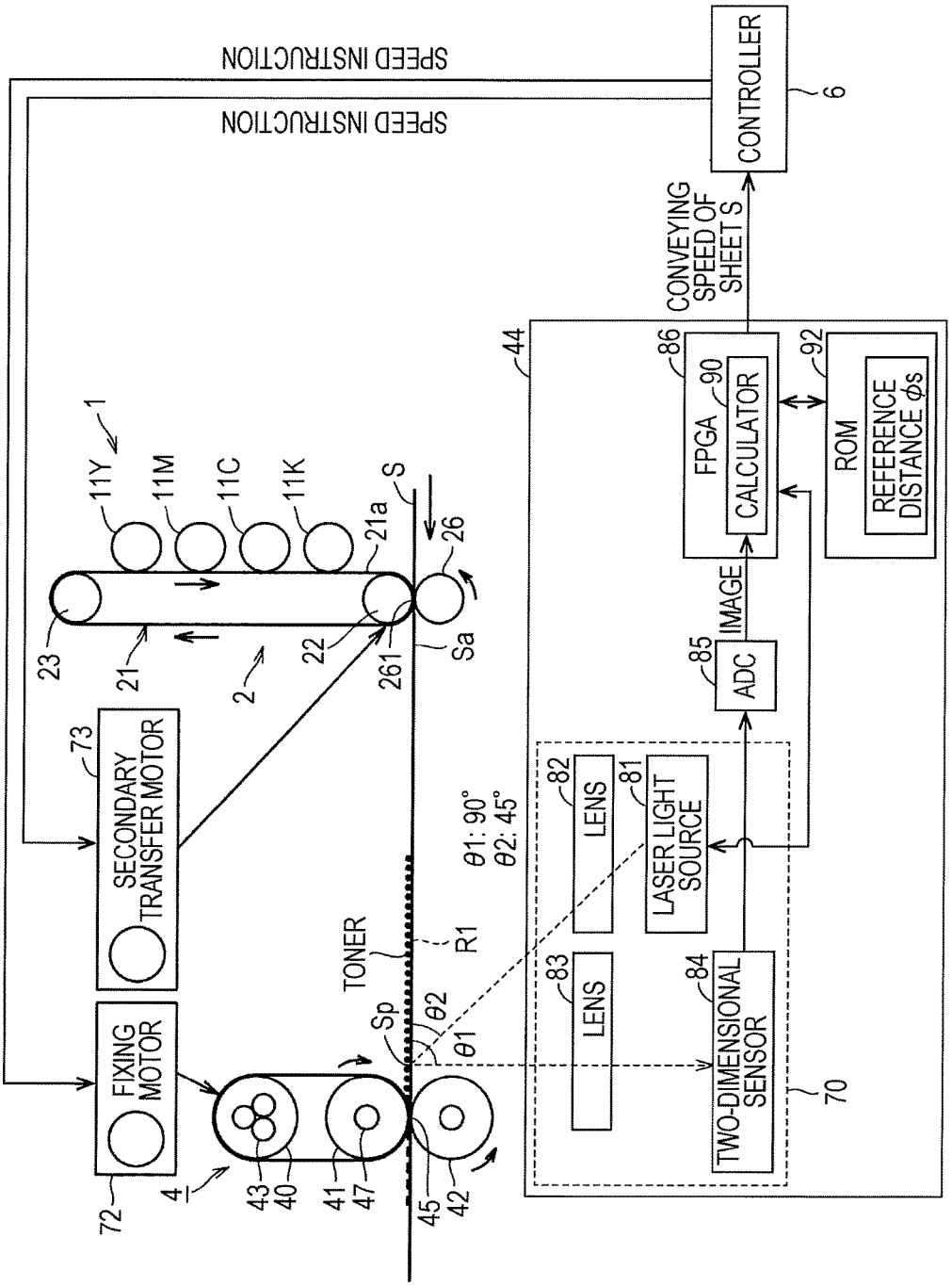
FIG. 3 is a diagram for explaining a configuration example of a sensor unit.

FIG. 3 is a diagram for explaining a configuration example of the sensor unit 44. In the example illustrated in FIG. 3, the sheet S is being conveyed to the fixing device 4.

The sensor unit 44 includes the image capturer 70, an analog-to-digital converter (ADC) 85, the FPGA 86, and a ROM 92. The sensor unit 44 functions as a movement amount sensing device for calculating the movement amount of the sheet S being conveyed during a certain period using the speckle pattern formed by the reflected light from the sheet S on a two-dimensional sensor 84. In other words, the sensor unit 44 is a non-contact type sensor that measures the conveying speed of the sheet S.

The image capturer 70 includes the laser light source 81, a lens 82 which is a collimator lens, a lens 83, and the two-dimensional sensor 84.

The laser light source 81 includes an aperture (diaphragm) (not illustrated). In an embodiment, this aperture may be elliptical. Note that, in another embodiment, the shape of the aperture is not limited to an elliptical shape and may have a quadrangular shape or another shape.

The two-dimensional sensor 84 has a plurality of photoelectric conversion elements arrayed in the conveying direction of the sheet S (hereinafter also referred to as "lateral direction") and an orthogonal direction orthogonal to this conveying direction (hereinafter also referred to as "longitudinal direction"). In an embodiment, the number of photoelectric conversion elements arrayed in the lateral direction is greater than the number of photoelectric conversion elements arrayed in the longitudinal direction, whereby the calculator 90 can calculate the movement amount of the sheet S more accurately.

In the manufacturing stage of the image forming apparatus 100, the laser light source 81 is set so as to emit laser light toward a predetermined irradiation position Sp on the conveying path R1. The laser light emitted from the laser light source 81 travels through the lens 82 and a surface Sa of the sheet S being conveyed is irradiated therewith.

An angle $\theta2$ formed between the laser light incident on the surface Sa of the sheet S and the surface Sa of the sheet S is 45° in FIG. 3. Note that the angle $\theta2$ is not limited to 45° and may be any angle within the range of 20° to 45°, for example.

The surface Sa of the sheet S can be said to be a roughened surface having minute irregularities from a microscopic viewpoint and, when this roughened surface is irradiated with laser light (coherent light), a granular pattern called speckle is generated. The speckle is generated because beams of light with different phases overlap due to superimposition of beams of scattered light caused by irregular reflection of laser light from respective places on the roughened surface.

Reflected light reflected from the surface Sa of the sheet S at an angle $\theta1$ (for example, 90°) among the laser light having generated the speckle travels through the lens 83 provided just below the irradiation position Sp and is focused on a sensing surface of the two-dimensional sensor 84 as a light receiver. As a result, a speckle pattern generated on the surface Sa of the sheet S positioned immediately above the sensing surface of the two-dimensional sensor 84 can be sensed thereon.

The speckle does not change unless the sheet S moves but changes as the sheet S moves. As the sheet S is conveyed, an irregular area on the roughened surface passing through the irradiation position Sp of laser light changes at each time point and the state of superimposition of the irregularly reflected light of the laser also changes at each time point.

The rate of change of the speckle depends on the conveying speed of the sheet S and the amount of received laser light on the sensing surface of the two-dimensional sensor 84 also changes due to a change in speckle. Therefore, by sensing a temporal change in the amount of received laser light on the sensing surface of the two-dimensional sensor 84, it is possible to measure the conveying speed of the surface of the sheet S. Thus, the irradiation position Sp of the laser light on the sheet S can be regarded as a measurement position of the conveying speed of the sheet surface.

The two-dimensional sensor 84 outputs an analog voltage signal according to the amount of received laser light focused on the sensing surface thereof to the analog-to-digital converter (ADC) 85 at a constant cycle, for example, every several milliseconds.

The ADC 85 converts the analog voltage signal from the two-dimensional sensor 84 into a digital signal each time the digital signal is received at a constant cycle and outputs the converted digital signal to the FPGA 86.

The FPGA 86 includes the calculator 90. Based on the two images captured at different timings, the index distance $\phi1$, and the reference distance $\phi s$ used for the comparison with the index distance $\phi1$, the calculator 90 calculates the movement amount of the sheet S between the capturing timings of the two images. The index distance $\phi1$ may be the length in the conveying direction (major axis) of the speckle pattern in at least one image out of the above-described two images. The reference distance $\phi s$ is assumed to be the length in the conveying direction (major axis) of the speckle pattern captured in a state where the sheet S and the image capturer 70 (the sensor surface of the two-dimensional sensor 84 included therein) are in a parallel relationship. In one aspect, the reference distance $\phi s$ may be the length in the conveying direction of the speckle pattern captured at the time of manufacturing the image forming apparatus 100. The reference distance $\phi s$ is saved in the ROM 92. The specific control of the calculator 90 will be described later with reference to FIGS. 4 and 5.

The calculator 90 calculates the conveying speed of the sheet S based on an interval between the capturing timings of the two images and the calculated movement amount. The calculator 90 outputs the calculated conveying speed of the sheet S to the controller 6. The controller 6 can be constituted by, for example, a central processing unit (CPU).

The controller 6 acquires the conveying speed of the sheet S being conveyed from the sensor unit 44. The controller 6 controls the rotation speed of the fixing motor 72 driving the fixing roller 41 based on the conveying speed of the sheet S and assigns the conveying speed of the sheet S as a target speed defined in advance. As a result, the controller 6 can suppress the occurrence of wrinkles on the sheet S at the nip area 45, for example.

Furthermore, the controller 6 may additionally control the rotation speed of a secondary transfer motor 73 driving the driving roller 22 based on the conveying speed of the sheet S acquired from the sensor unit 44. At this time, the controller 6 controls the secondary transfer motor 73 such that the rotation speed of the fixing motor 72 is faster than the rotation speed of the secondary transfer motor 73. As a result, the sheet S is pulled by the fixing device 4 and wrinkles can be prevented from occurring on the sheet S at the nip area 45.

Furthermore, based on the conveying speed of the sheet S acquired from the sensor unit 44, the controller 6 may control timings at which the toner images formed on the photosensitive drums 11M, 11C, and 11K are primarily transferred onto the intermediate transfer belt. As a result, the image forming apparatus 100 can suppress occurrence of color misregistration in the document. In particular, when a long sheet S (roll sheet 33) as illustrated in FIG. 2 is used as a recording medium, since the recording medium is conveyed while being pulled by the fixing device 4 (the nip area 45 located therein), the conveying speed of the recording medium at the secondary transfer position 261 (that is, the surface speed of the intermediate transfer belt 21) can be affected by these members of the fixing device 4. Regarding this respect, the image forming apparatus 100 according to the embodiment regulates a primary transfer timing of each color based on the precise conveying speed of the sheet S (the surface speed of the intermediate transfer belt 21) from the sensor unit 44, thereby being able to suppress color misregistration and to make the image formed on the sheet S (recording medium) more beautiful.

(Control Structure of Calculator 90)

Figure 4:
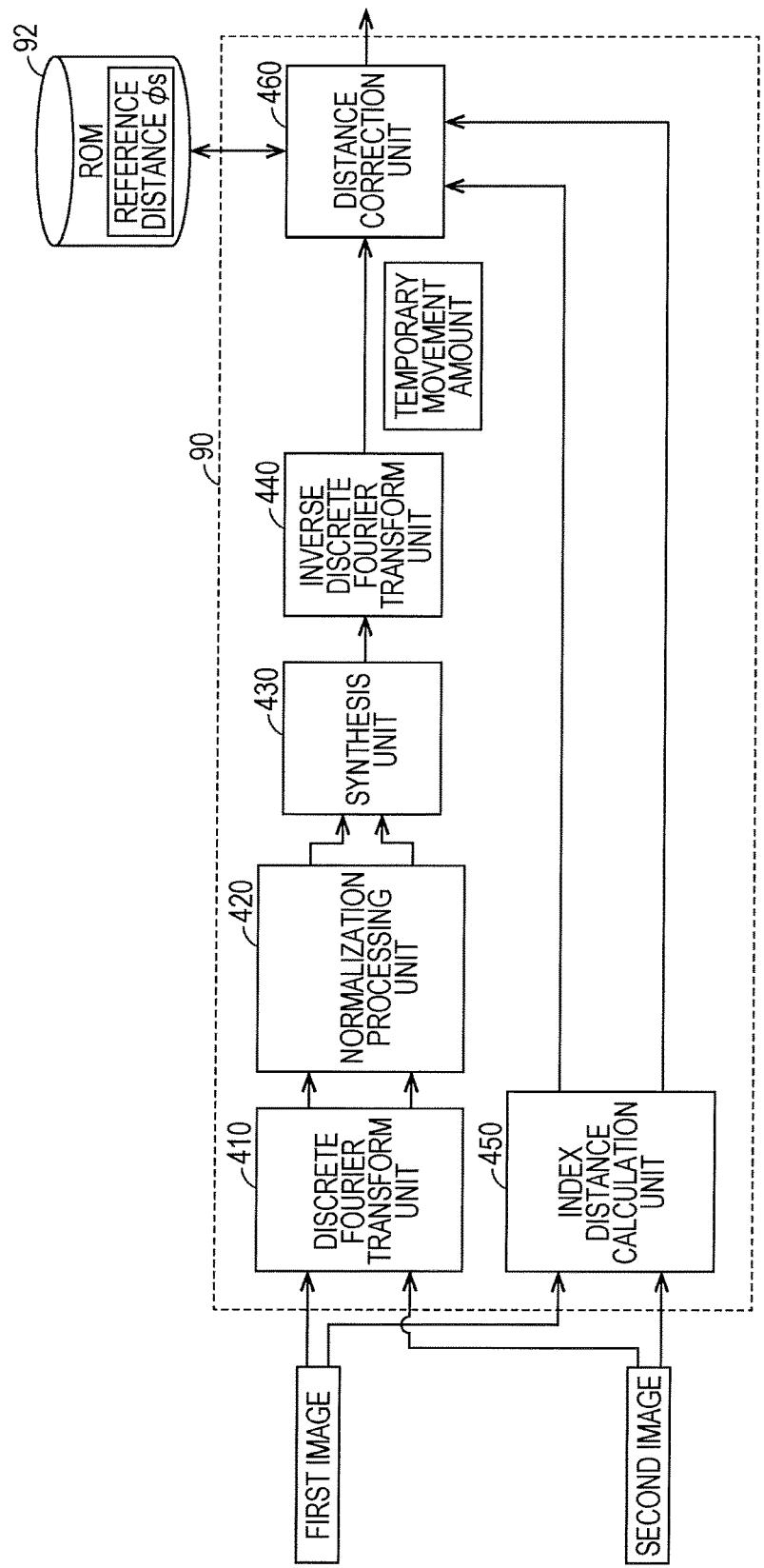
FIG. 4 is a diagram for explaining a control structure of a calculator according to a first embodiment.

FIG. 4 is a diagram for explaining a control structure of the calculator 90 according to the first embodiment. The calculator 90 includes a discrete Fourier transform unit 410, a normalization processing unit 420, a synthesis unit 430, an inverse discrete Fourier transform unit 440, an index distance calculation unit 450, and a distance correction unit 460.

The discrete Fourier transform unit 410 executes discrete Fourier transform processing on the first image and the second image captured by the image capturer 70 at different timings to decompose data thereof into each wavenumber component. The discrete Fourier transform unit 410 outputs the data decomposed into each wavenumber component to the normalization processing unit 420.

The normalization processing unit 420 multiplies the amplitude corresponding to the first image by the amplitude corresponding to the second image for each wavenumber component. As a result, the normalization processing unit 420 normalizes the magnitude of amplitude of each wavenumber and extracts phase information on each wavenumber. The normalization processing unit 420 outputs the extracted phase information to the synthesis unit 430.

The synthesis unit 430 synthesizes the phase information extracted for each wavenumber. The synthesis unit 430 calculates a shift amount of a peak based on the synthesized phase information to derive a phase difference between the first image and the second image. The synthesis unit 430 outputs the derived phase difference to the inverse discrete Fourier transform unit 440.

The inverse discrete Fourier transform unit 440 performs inverse discrete Fourier transform processing on the derived phase difference in a wavenumber space, thereby transforming this phase difference into a temporary movement amount which is a distance in the real space. The inverse discrete Fourier transform unit 440 outputs the transformed temporary movement amount to the distance correction unit 460.

The index distance calculation unit 450 acquires a length d1 of the speckle pattern in the conveying direction in the first image and a length d2 of the speckle pattern in the conveying direction in the second image by image processing.

As an example, the index distance calculation unit 450 scans a luminance distribution in the first image in the lateral direction or the longitudinal direction and specifies a position where a vertical relationship with a threshold luminance is reversed as an edge (end) of the speckle pattern. The index distance calculation unit 450 may specify an area where the distance (number of pixels) between edges is longest in the conveying direction and specify this distance as the length d1 of the speckle pattern in the conveying direction.

The index distance calculation unit 450 may specify an average value of the acquired length d1 and length d2 as the index distance $\phi 1$. The index distance calculation unit 450 outputs the specified index distance $\phi 1$ to the distance correction unit 460.

The distance correction unit 460 accesses the ROM 92 to acquire the reference distance $\phi s$. The distance correction unit 460 calculates the ratio of the reference distance $\phi s$ to the index distance $\phi 1$. The distance correction unit 460 multiplies the temporary movement amount input from the inverse discrete Fourier transform unit 440 by the calculated ratio to calculate the movement amount of the sheet S between the capturing timings of the first image and the second image.

Note that, in an embodiment, the distance correction unit 460 may treat this ratio as one when the ratio of the reference distance $\phi s$ to the index distance $\phi 1$ is less than one.

(Flow of Control for Calculating Conveying Speed—Part 1)

Figure 5:
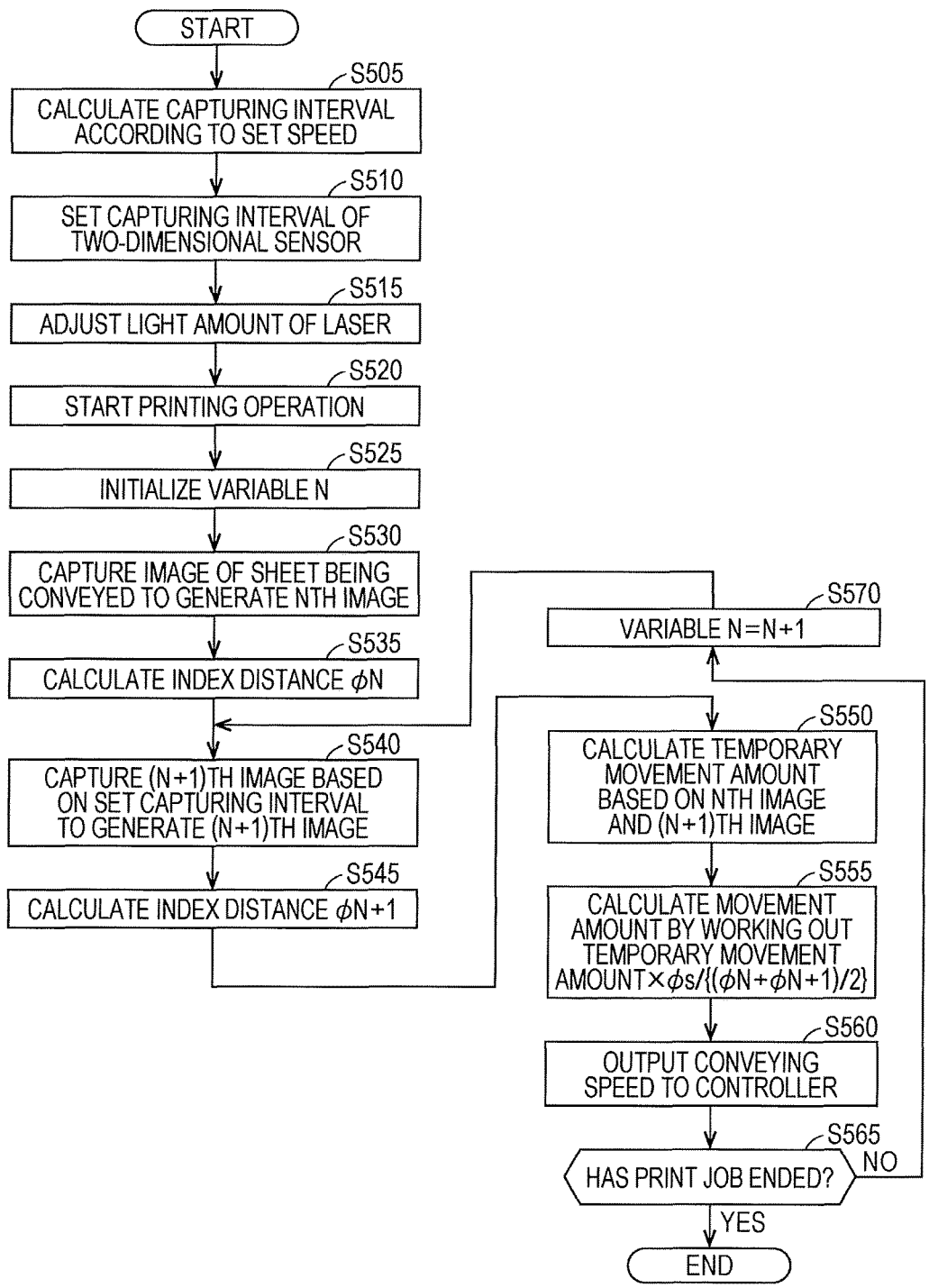
FIG. 5 is a flowchart for explaining control for calculating a conveying speed of a sheet being conveyed.

FIG. 5 is a flowchart for explaining control for calculating the conveying speed of the sheet S being conveyed. The processing illustrated in FIG. 5 can be realized by the FPGA 86. In another aspect, part or all of the processing may be realized by the controller 6 (CPU) or may be realized by other hardware. Note that the series of items of processing illustrated in FIG. 5 can be executed in response to the input of a print job to the image forming apparatus 100. In addition, it is assumed that these conditions are the same in flowcharts illustrated in FIGS. 7, 11, and 14.

In step S505, the FPGA 86 calculates the interval of capturing the image (speckle pattern) by the image capturer 70 in accordance with a set speed. The set speed is the conveying speed of the sheet S supposed by the voltage applied to the fixing motor 72 and the secondary transfer motor 73, or the like.

In step S510, the FPGA 86 sets a light amount catching time (that is, a capturing interval) of the two-dimensional sensor 84 based on the calculated capturing interval. In one aspect, the FPGA 86 may set the capturing interval of the image capturer 70 to 1 ms.

In step S515, the FPGA 86 regulates the amount of the laser light from the laser light source 81. For example, the FPGA 86 can realize the above processing by adjusting the output of a PIN photodiode included in the laser light source 81.

In step S520, the FPGA 86 starts a printing operation and starts conveying the sheet S.

In step S525, the FPGA 86 initializes a variable N (for example, sets to one). This variable N may be saved in, for example, a random access memory (RAM) (not illustrated).

In step S530, the FPGA 86 captures an image of the sheet S being conveyed using the image capturer 70 to generate an Nth image.

In step S535, the FPGA 86 as the index distance calculation unit 450 calculates a distance in the conveying direction of a speckle pattern included in the Nth image, that is, an index distance $\phi N$. The FPGA 86 may store the calculated index distance $\phi N$ to a storage such as a RAM (not illustrated).

In step S540, the FPGA 86 again captures an image of the sheet S being conveyed using the image capturer 70 to generate an (N+1)th image after the capturing interval set in step S510 elapses.

In step S545, the FPGA 86 calculates an index distance $\phi N+1$ of a speckle pattern included in the (N+1)th image.

In step S550, based on the Nth image and the (N+1)th image, the FPGA 86 as the calculator 90 calculates the temporary movement amount of the sheet S between the capturing timings of these images.

In step S555, the FPGA 86 calculates the average value of the index distances $\phi N$ and $\phi N+1$. Furthermore, the FPGA 86 calculates a ratio of the reference distance $\phi s$ to the calculated average value. Furthermore, the FPGA 86 multiplies the temporary movement amount calculated in step S550 by the above ratio to calculate the movement amount of the sheet S.

In step S560, the FPGA 86 calculates the conveying speed of the sheet S from the capturing interval set in step S510 and the movement amount of the sheet S. The FPGA 86 outputs the calculated conveying speed to the controller 6.

In step S565, the FPGA 86 determines whether the print job has ended. For example, when the print job is ended, the controller 6 notifies the FPGA 86 of that effect. As a result, the FPGA 86 can make this determination.

When the FPGA 86 determines that the print job has ended (YES in step S565), the FPGA 86 ends the series of items of processing. When the FPGA 86 determines that the print job has not ended yet (NO in step S565), the FPGA 86 returns the processing to step S570.

In step S570, the FPGA 86 increments the variable N and then returns the processing to step S540.

According to the above configuration, the image forming apparatus 100 according to the embodiment can precisely calculate the movement amount (conveying speed) of the sheet S even when the positional relationship between the image capturer 70 (the sensor surface of the two-dimensional sensor 84 included therein) and the sheet S is altered because, for example, the image capturer 70 or the sensor unit 44 including the image capturer 70 is inclined or the sheet S is inclined with respect to the conveying path R1.

Furthermore, the controller 6 of the image forming apparatus 100 can control the rotation speed of the fixing motor 72, the rotation speed of the secondary transfer motor 73, and the like based on the precise conveying speed of the sheet S calculated by the sensor unit 44. As a result, for example, the controller 6 can suppress color misregistration in the sheet S (recording medium) and prevent wrinkles from occurring on the sheet S at the nip area 45 of the fixing device 4.

Second Embodiment

The calculator 90 according to the first embodiment calculates the temporary movement amount of the sheet S based on the first image and the second image and then corrects the temporary movement amount using the ratio of the reference distance $\phi s$ to the index distance $\phi 1$, thereby calculating the movement amount of the sheet S.

A calculator according to a second embodiment corrects the luminance of the first image and the second image using the above ratio and then calculates the movement amount of the sheet S based on the corrected images. Hereinafter, the configuration of this calculator and control for calculating the conveying speed of the sheet S will be described. Note that an image forming apparatus according to the second embodiment has the same structure as the above-described structure of the image forming apparatus 100 except that the image forming apparatus according to the second embodiment has a calculator 90A to be described later instead of the calculator 90. Accordingly, the detailed configuration of the image forming apparatus according to the second embodiment will not be repeatedly described.

(Control Structure of Calculator 90A)

Figure 6:
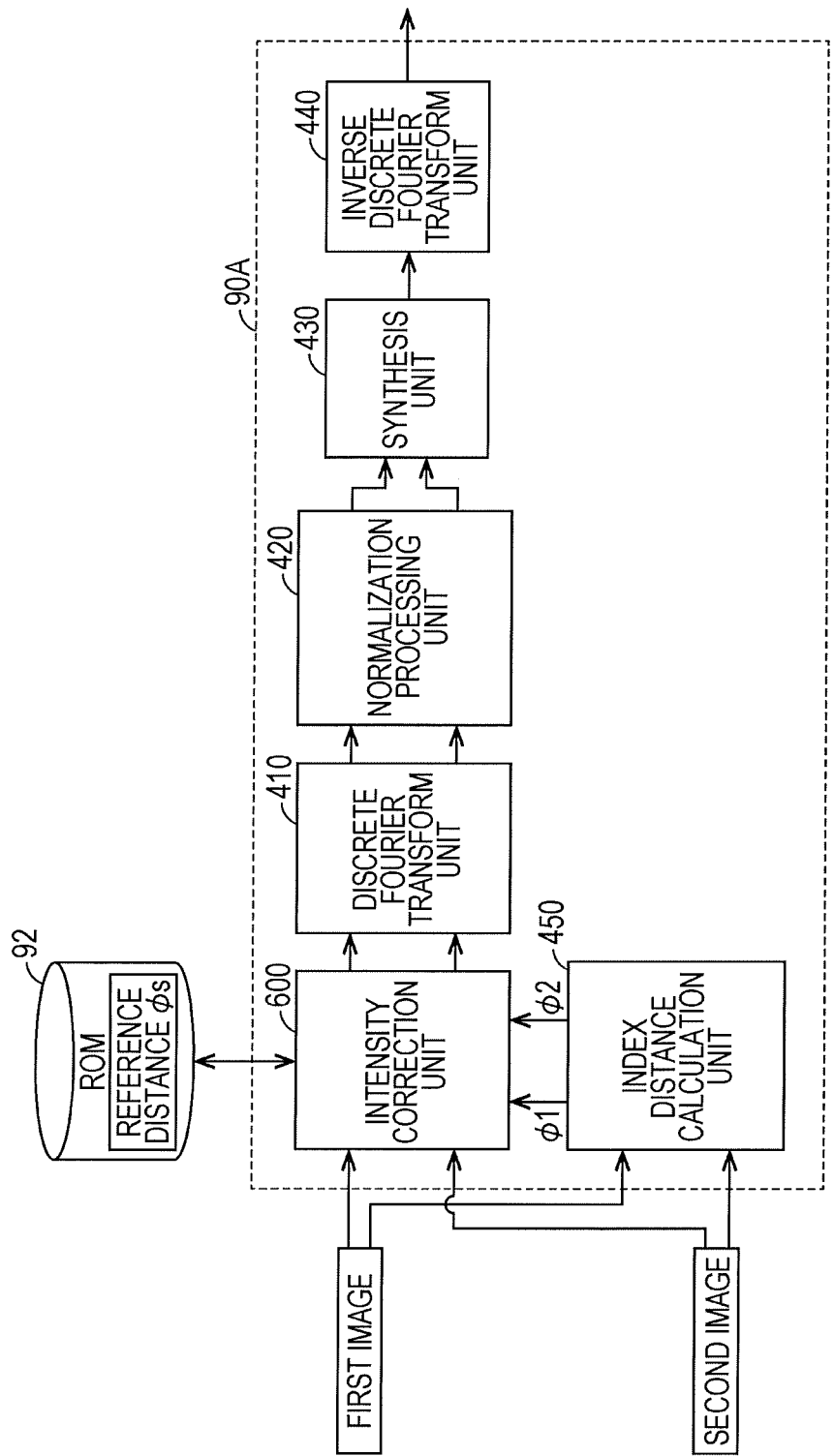
FIG. 6 is a diagram for explaining a control structure of a calculator according to a second embodiment.

FIG. 6 is a diagram for explaining a control structure of the calculator 90A according to the second embodiment. Note that members denoted by the same reference numerals as those in FIG. 4 are the same and therefore the description thereof will not be repeated.

The calculator 90A differs from the calculator 90 described with reference to FIG. 4 in that the calculator 90A has an intensity correction unit 600 and does not have the distance correction unit 460.

The intensity correction unit 600 accepts inputs of the first image and the second image captured by an image capturer 70 at different timings. In addition, the intensity correction unit 600 accepts inputs of the index distances $\phi 1$ and $\phi 2$ calculated by an index distance calculation unit 450. This index distance $\phi 1$ represents the length of the speckle pattern in the conveying direction in the first image and the index distance $\phi 2$ represents the length of the speckle pattern in the conveying direction in the second image.

The intensity correction unit 600 calculates an average value of the index distances $\phi 1$ and $\phi 2$. The intensity correction unit 600 calculates a ratio of the reference distance $\phi s$ to this average value. The intensity correction unit 600 multiplies the luminance of each pixel in the first image and the second image by this ratio to correct these images. The intensity correction unit 600 outputs the corrected first image and second image to a discrete Fourier transform unit 410.

In another aspect, the intensity correction unit 600 may correct the luminance of each pixel of the first image using the ratio of the reference distance $\phi s$ to the index distance $\phi 1$ and correct the luminance of each pixel of the second image using the ratio of the reference distance $\phi s$ to the index distance $\phi 2$.

(Flow of Control for Calculating Conveying Speed—Part 2)

Figure 7:
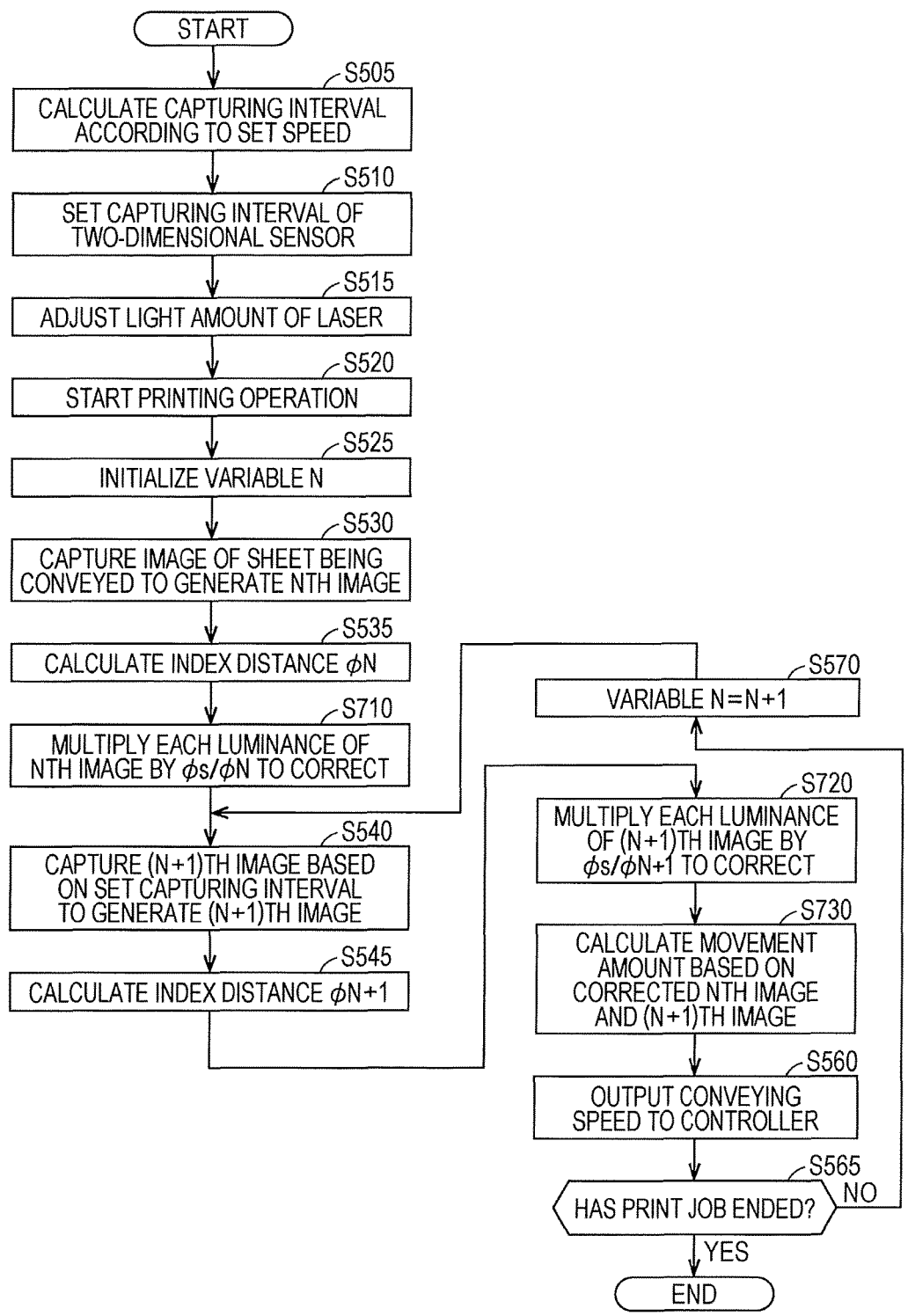
FIG. 7 is a flowchart for explaining control for calculating the conveying speed of the sheet being conveyed, according to the second embodiment.

FIG. 7 is a flowchart for explaining control for calculating the conveying speed of the sheet S being conveyed, according to the second embodiment. Note that processing denoted by the same reference numerals as those in FIG. 5 is the same processing and therefore the description thereof will not be repeated.

In step S710, the FPGA 86 calculates the ratio of the reference distance $\phi s$ to the index distance $\phi N$. Furthermore, the FPGA 86 multiplies the luminance of each pixel in the generated Nth image by the calculated ratio to correct the Nth image.

Likewise in step S720, the FPGA 86 calculates the ratio of the reference distance $\phi s$ to the index distance $\phi N+1$.

Furthermore, the FPGA 86 multiplies the luminance of each pixel in the generated (N+1)th image by the above ratio to correct the (N+1)th image.

In step S730, based on the corrected Nth image and the corrected (N+1)th image, the FPGA 86 as the calculator 90A calculates the movement amount of the sheet S between the capturing timings of these images.

By the configuration for previously correcting the luminance of the generated image, as in the image forming apparatus 100 according to the first embodiment, the image forming apparatus according to the second embodiment can precisely calculate the movement amount of the sheet S even when the positional relationship between the image capturer 70 (the sensor surface of a two-dimensional sensor 84 included therein) and the sheet S is altered.

Third Embodiment

As described above, when the sheet S is inclined with respect to the conveying path R1, the positional relationship between the image capturer 70 and the sheet S is altered and an error in the movement amount of the sheet S could increase. One of the causes of the inclination of the sheet S with respect to the conveying path R1 is the eccentricity of the conveying roller including the fixing roller 41 and the like. Therefore, an image forming apparatus according to the third embodiment calculates the movement amount of the sheet S in consideration of the eccentricity of the conveying roller that conveys the sheet S. Hereinafter, calculation control for the movement amount of the sheet S in this image forming apparatus 100 according to the third embodiment will be described.

Note that the image forming apparatus according to the third embodiment has the same structure as the above-described structure of the image forming apparatus 100 except that the image forming apparatus according to the third embodiment has a calculator 90B to be described later instead of the calculator 90. Accordingly, the detailed configuration of the image forming apparatus according to the third embodiment will not be repeatedly described.

(Eccentricity of Roller)

Figure 8:
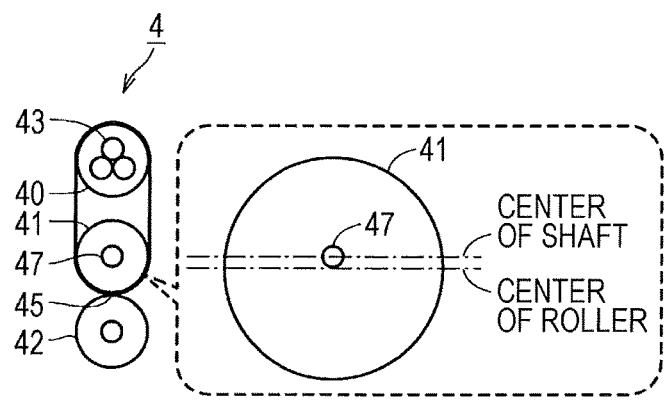
FIG. 8 is a diagram for explaining eccentricity in a fixing roller.

FIG. 8 is a diagram for explaining eccentricity in a fixing roller 41. As illustrated in FIG. 8, a rotation shaft 47 of the fixing roller 41 constituting a fixing device 4 deviates from the center of the fixing roller 41 in some cases. When the fixing roller 41 is eccentric in this manner, the inclination of the sheet S with respect to a conveying path R1 periodically changes.

(Variation of Index Distance Due to Eccentricity)

Figure 9:
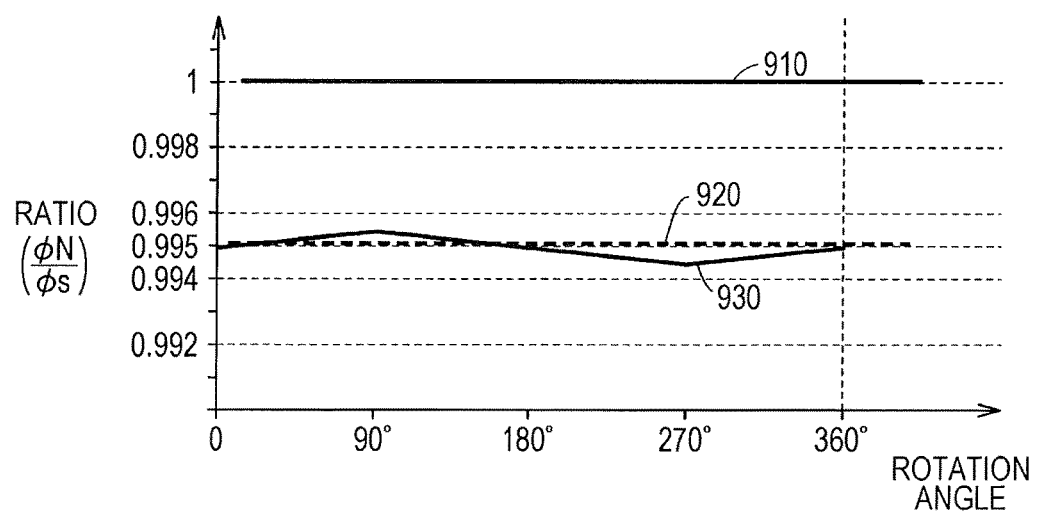
FIG. 9 is a diagram for explaining a relationship between eccentricity of a fixing roller and a ratio of an index distance to a reference distance.

FIG. 9 is a diagram for explaining a relationship between eccentricity of the fixing roller 41 and the ratio of the index distance $\phi N$ to the reference distance $\phi s$. The lateral axis in FIG. 9 represents the rotation angle of the fixing roller 41. The longitudinal axis in FIG. 9 represents the ratio of the index distance $\phi N$ to the reference distance $\phi s$. The index distance $\phi N$ indicates a distance in the conveying direction of a speckle pattern included in an image captured by an image capturer 70 during one rotation of the fixing roller 41. In the example in FIG. 9, it is assumed that the image capturer 70 generates 200 images following a predetermined capturing interval while the fixing roller 41 makes one rotation. As a result, the index distances $\phi 1$-$\phi 200$ are calculated. For example, the index distance $\phi 50$ represents a distance in the conveying direction of a speckle pattern included in an image captured by the image capturer 70 when the rotation angle of the fixing roller 41 is 90°.

A distribution 910 indicates the ratio between the index distance $\phi N$ and the reference distance $\phi s$ based on the images captured by the image capturer 70 in a state in which the image capturer 70 is not inclined from the time of manufacturing the image forming apparatus (in a state in which the image capturer 70 and the conveying path R1 are parallel) and also the fixing roller 41 is not eccentric. In the distribution 910, it can be seen that the ratio of the index distance $\phi N$ to the reference distance $\phi s$ is one regardless of the rotation angle of the fixing roller 41.

A distribution 920 indicates the ratio between the index distance $\phi N$ and the reference distance $\phi s$ based on the images captured by the image capturer 70 in a state in which the image capturer 70 is inclined from the time of manufacturing the image forming apparatus and also the fixing roller 41 is not eccentric. In the distribution 920, it can be seen that the ratio of the index distance $\phi N$ to the reference distance $\phi s$ is constant (0.995) regardless of the rotation angle of the fixing roller 41.

A distribution 930 indicates the ratio between the index distance $\phi N$ and the reference distance $\phi s$ based on the images captured by the image capturer 70 in a state in which the image capturer 70 is inclined from the time of manufacturing the image forming apparatus and also the fixing roller 41 is eccentric. In the distribution 930, it can be seen that the ratio of the index distance $\phi N$ to the reference distance $\phi s$ changes in accordance with the rotation angle of the fixing roller 41. This represents that the inclination angle of the sheet S with respect to the conveying path R1 changes in accordance with the rotation angle of the fixing roller 41.

The image forming apparatuses according to the above-described first and second embodiments calculate the movement amount in accordance with the ratio between the index distance and the reference distance. Accordingly, the movement amount (conveying speed) of the sheet S calculated by the image forming apparatuses according to the above embodiments changes in accordance with the rotation angle of the fixing roller 41. Actually, however, the conveying speed of the sheet S does not change in accordance with the rotation angle of the fixing roller 41. Therefore, the image forming apparatus according to the third embodiment calculates the movement amount of the sheet S using an average value of the index distances acquired while the fixing roller 41 makes at least one rotation.

For example, a ratio between an average value of the index distances $\phi 1$-$\phi 200$ and the reference distance $\phi s$ in the distribution 930 is approximately equal to the ratio indicated by the distribution 920. Therefore, the image forming apparatus according to the third embodiment can mainly correct an error in the movement amount due to the inclination of the image capturer 70 using the average value of the index distances acquired during a rotation cycle of the fixing roller 41.

(Control Structure of Calculator 90B)

Figure 10:
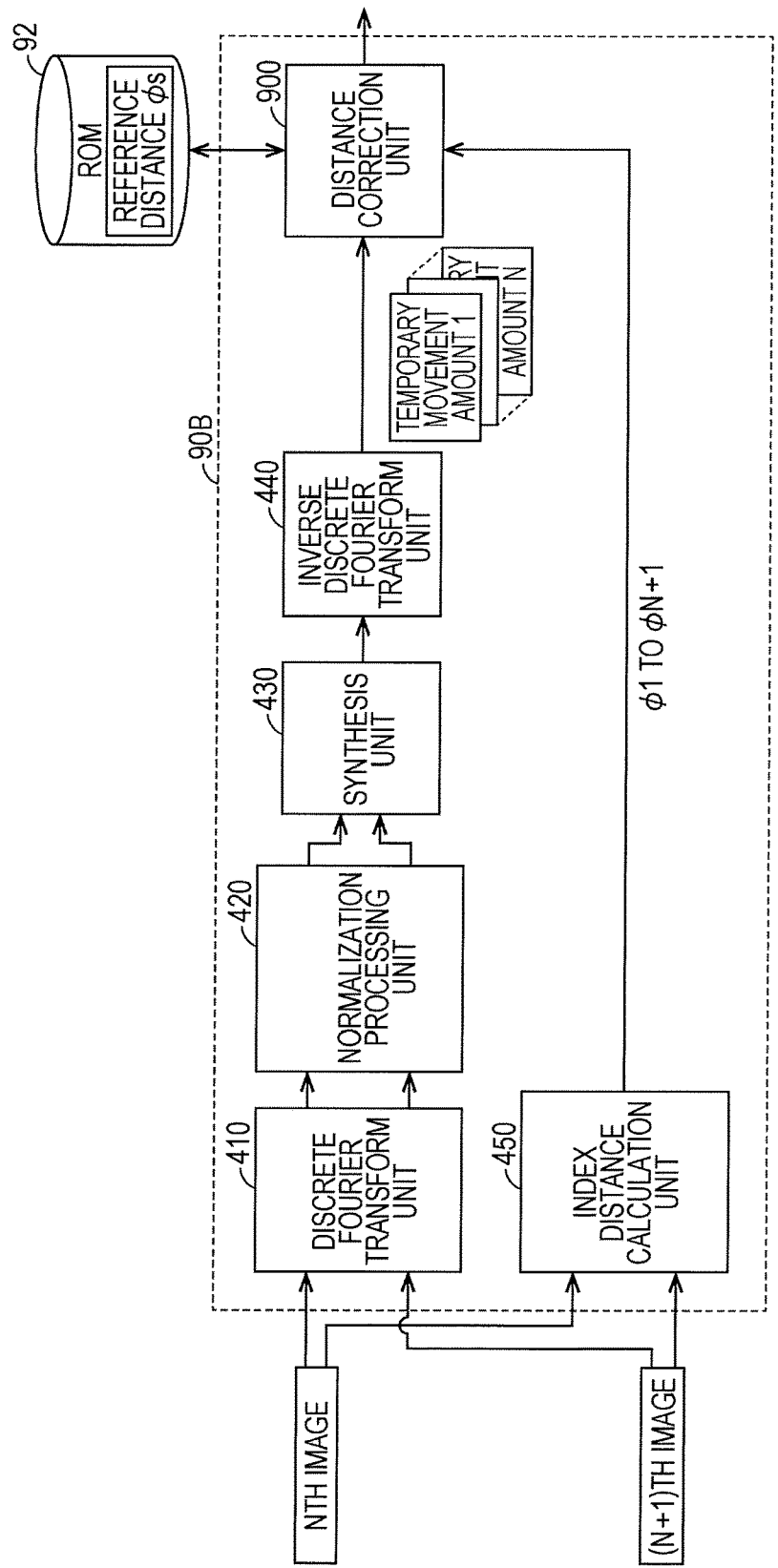
FIG. 10 is a diagram for explaining a control structure of a calculator according to a third embodiment.

FIG. 10 is a diagram for explaining a control structure of the calculator 90B according to the third embodiment. Note that members denoted by the same reference numerals as those in FIG. 4 are the same and therefore the description thereof will not be repeated.

The calculator 90B differs from the calculator 90 described with reference to FIG. 4 in that the calculator 90B includes a distance correction unit 900 instead of the distance correction unit 460.

The calculator 90B calculates temporary movement amounts 1, 2, . . . , 199 based on the Nth image and the (N+1)th image (N=1, 2, . . . , 199) by the actions of a discrete Fourier transform unit 410, a normalization processing unit 420, a synthesis unit 430 and an inverse discrete Fourier transform unit 440. The variable N may be the number of images continuously captured (generated) while the fixing roller 41 makes one rotation. Note that, in another aspect, the variable N may be the number of images continuously captured while the fixing roller 41 makes at least one rotation. In yet another aspect, the variable N may be the number of images continuously captured over a period of an integral multiple of the rotation cycle of the fixing roller 41.

In addition, an index distance calculation unit 450 calculates the index distances $\phi1, \phi2, \ldots, \phi200$ from the Nth image (N=1, 2, ..., 200) and outputs these index distances to the distance correction unit 900.

The distance correction unit 900 calculates an average value of the input index distances $\phi1, \phi2, \ldots, \phi200$ (hereinafter also referred to as "average index distance"). The distance correction unit 900 calculates the ratio of the reference distance $\phi s$ to the average index distance. The distance correction unit 900 calculates an average value of the temporary movement amounts 1, 2, ..., 199 input from the inverse discrete Fourier transform unit 440 (hereinafter also referred to as "average temporary movement amount"). The distance correction unit 900 can calculate the movement amount of the sheet S by multiplying the average temporary movement amount by the calculated ratio mentioned above. Note that, in another aspect, the distance correction unit 900 may calculate a value by multiplying the immediate input (calculated) temporary movement amount 199 by the above ratio as the movement amount of the sheet S.

Note that, in the above example, the calculator 90B calculates the movement amount in consideration of the eccentricity of the fixing roller 41 arranged on the downstream side of the irradiation position Sp of a laser light source 81. In another aspect, the calculator 90B may calculate the movement amount in consideration of the eccentricity of a driving roller 22 arranged on the upstream side of the irradiation position Sp of the laser light source 81.

(Flow of Control for Calculating Conveying Speed—Part 3)

Figure 11:
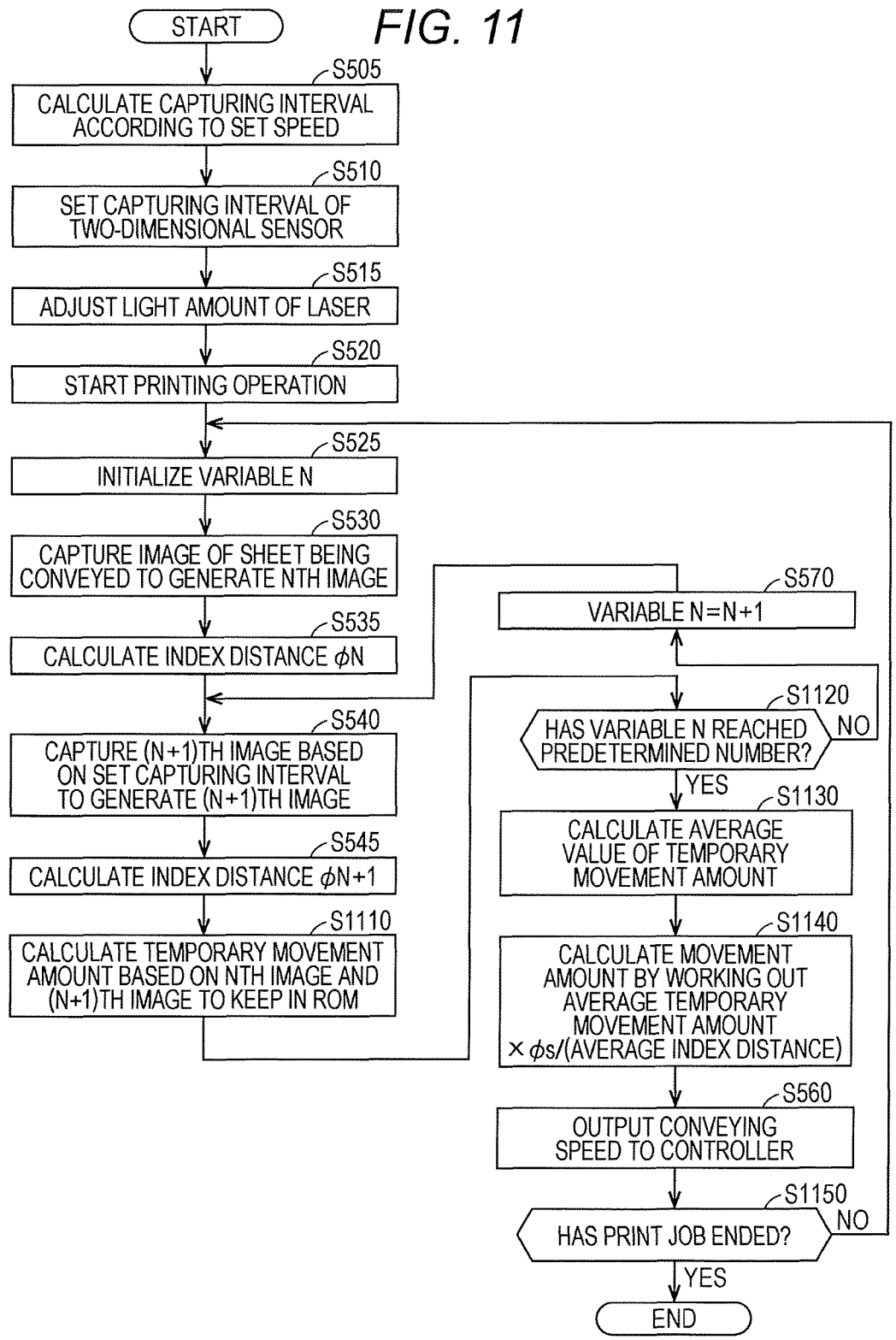
FIG. 11 is a flowchart for explaining control for calculating the conveying speed of the sheet being conveyed, according to the third embodiment.

FIG. 11 is a flowchart for explaining control for calculating the conveying speed of the sheet S being conveyed, according to the third embodiment. Note that processing denoted by the same reference numerals as those in FIG. 5 is the same processing and therefore the description thereof will not be repeated.

In step S1110, an FPGA 86 as the calculator 90B calculates the temporary movement amount N based on the Nth image and the (N+1)th image. Furthermore, the FPGA 86 saves the calculated temporary movement amount N in a ROM 92.

In step S1120, the FPGA 86 determines whether the variable N has reached a predetermined number. The predetermined number is assumed as 199, for example.

When the FPGA 86 determines that the variable N has reached the predetermined number (YES in step S1120), the FPGA 86 advances the processing to step S1130. On the other hand, when the FPGA 86 determines that the variable N has not reached the predetermined number (NO in step S1120), the FPGA 86 advances the processing to step S570.

In step S1130, the FPGA 86 calculates the average temporary movement amount which is an average value of the calculated temporary movement amounts. More specifically, the FPGA 86 calculates an average value of the predetermined number of temporary movement amounts.

In step S1140, the FPGA 86 calculates the average index distance which is an average value of the calculated index distances. More specifically, the FPGA 86 calculates an average value of the predetermined number+1 of index distances. Furthermore, the FPGA 86 calculates a ratio of the reference distance $\phi s$ to the average index distance. Furthermore, the FPGA 86 multiplies the average temporary movement amount by this ratio to calculate the movement amount of the sheet S at the capturing interval of a two-dimensional sensor 84.

In step S1150, the FPGA 86 determines whether the print job has ended. When the FPGA 86 determines that the print job has ended (YES in step S1150), the FPGA 86 ends the series of items of processing. When the FPGA 86 determines that the print job has not ended yet (NO in step S1150), the FPGA 86 returns the processing to step S525.

According to the above configuration, the image forming apparatus according to the third embodiment can calculate the movement amount (conveying speed) of the sheet S in consideration of the eccentricity of the roller. Thus, the image forming apparatus according to the third embodiment can more precisely calculate the movement amount (conveying speed) of the sheet S than the image forming apparatuses according to the first and second embodiments.

Fourth Embodiment

The image forming apparatus according to the third embodiment calculates the ratio of the reference distance $\phi s$ to the average index distance after printing is started. An image forming apparatus according to a fourth embodiment calculates this ratio before printing is started. Note that the image forming apparatus according to the fourth embodiment may have the same configuration as that of the image forming apparatus according to the third embodiment.

(Flow of Control for Calculating Conveying Speed—Part 4)

Figure 12:
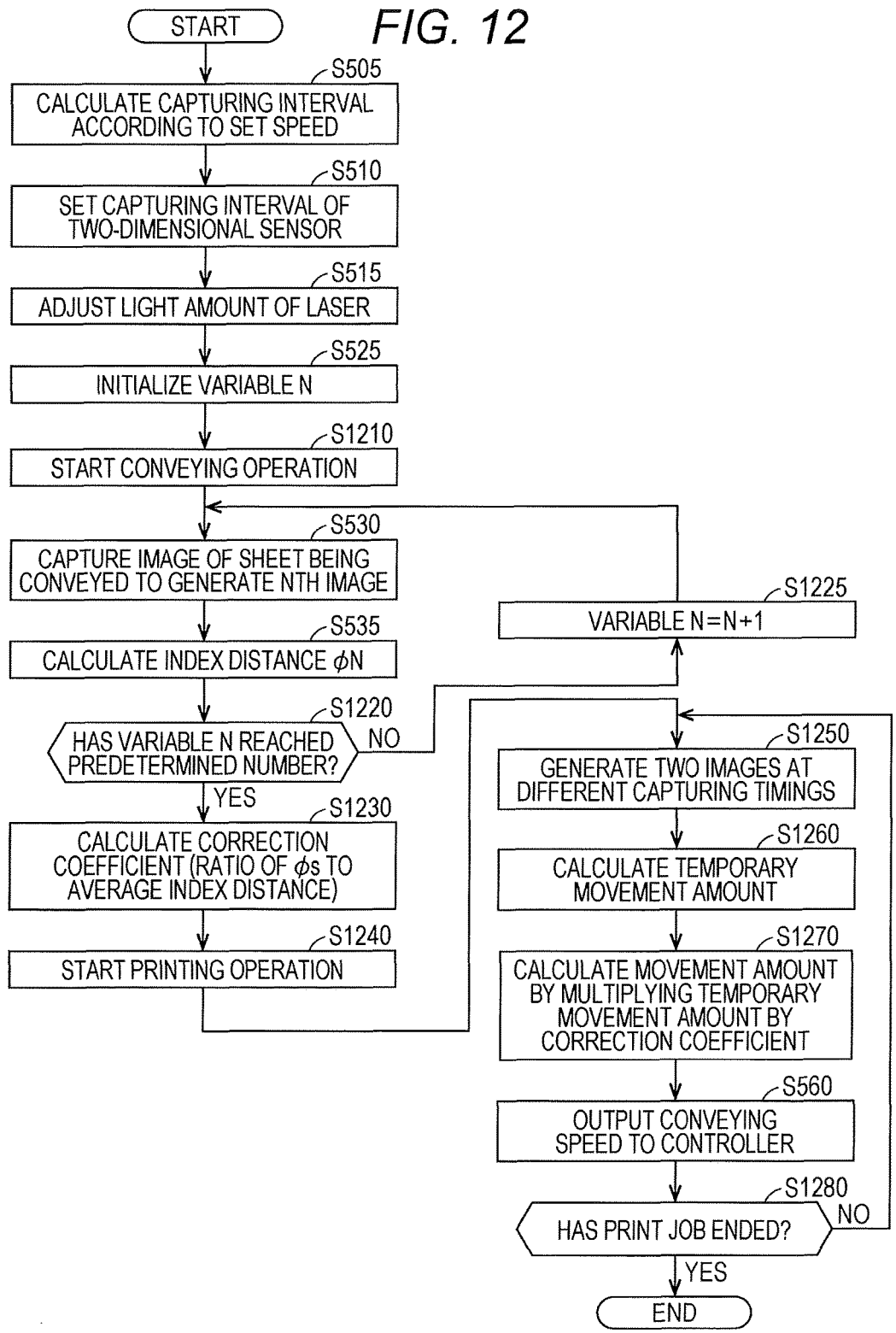
FIG. 12 is a flowchart for explaining control for calculating the conveying speed of the sheet being conveyed, according to a fourth embodiment.

FIG. 12 is a flowchart for explaining control for calculating the conveying speed of the sheet S being conveyed, according to the fourth embodiment. Note that processing denoted by the same reference numerals as those in FIG. 5 is the same processing and therefore the description thereof will not be repeated.

In step S1210, an FPGA 86 starts conveying the sheet S. In step S1220, the FPGA 86 determines whether the variable N has reached a predetermined number (for example, 200).

When the FPGA 86 determines that the variable N has reached the predetermined number (YES in step S1220), the FPGA 86 advances the processing to step S1230. On the other hand, when the FPGA 86 determines that the variable N has not reached the predetermined number (NO in step S1220), the FPGA 86 advances the processing to step S1225.

In step S1225, the FPGA 86 increments the variable N and then returns the processing to step S530.

In step S1230, the FPGA 86 calculates a correction coefficient. In this embodiment, the correction coefficient is a ratio of the reference distance $\phi s$ to the average index distance which is an average value of the predetermined number of index distances.

In step S1240, the FPGA 86 starts a printing operation. In step S1250, the FPGA 86 generates two images captured by an image capturer 70 at different timings.

In step S1260, based on the above two images, the FPGA 86 as the calculator 90B calculates the temporary movement amount of the sheet S between the capturing timings of these images.

In step S1270, the FPGA 86 multiplies the calculated temporary movement amount by the correction coefficient to calculate the movement amount of the sheet S.

In step S560, the FPGA 86 calculates the conveying speed of the sheet S from the capturing interval set in step S510 and the movement amount of the sheet S. The FPGA 86 outputs the calculated conveying speed to a controller 6.

In step S1280, the FPGA 86 determines whether the print job has ended. When the FPGA 86 determines that the print job has ended (YES in step S1280), the FPGA 86 ends the series of items of processing. When the FPGA 86 determines that the print job has not ended yet (NO in step S1280), the FPGA 86 returns the processing to step S1250.

According to the above configuration, since the correction coefficient is calculated before printing is started, the image forming apparatus according to the fourth embodiment can more precisely calculate the movement amount (conveying speed) of the sheet S under printing than the image forming apparatus according to the third embodiment.

Fifth Embodiment

An image forming apparatus according to a fifth embodiment can physically sense the rotation angle of an eccentric roller with a sensor and mainly correct an error in the movement amount due to the inclination of an image capturer 70 using a correction coefficient according to this rotation angle.

Figure 13:
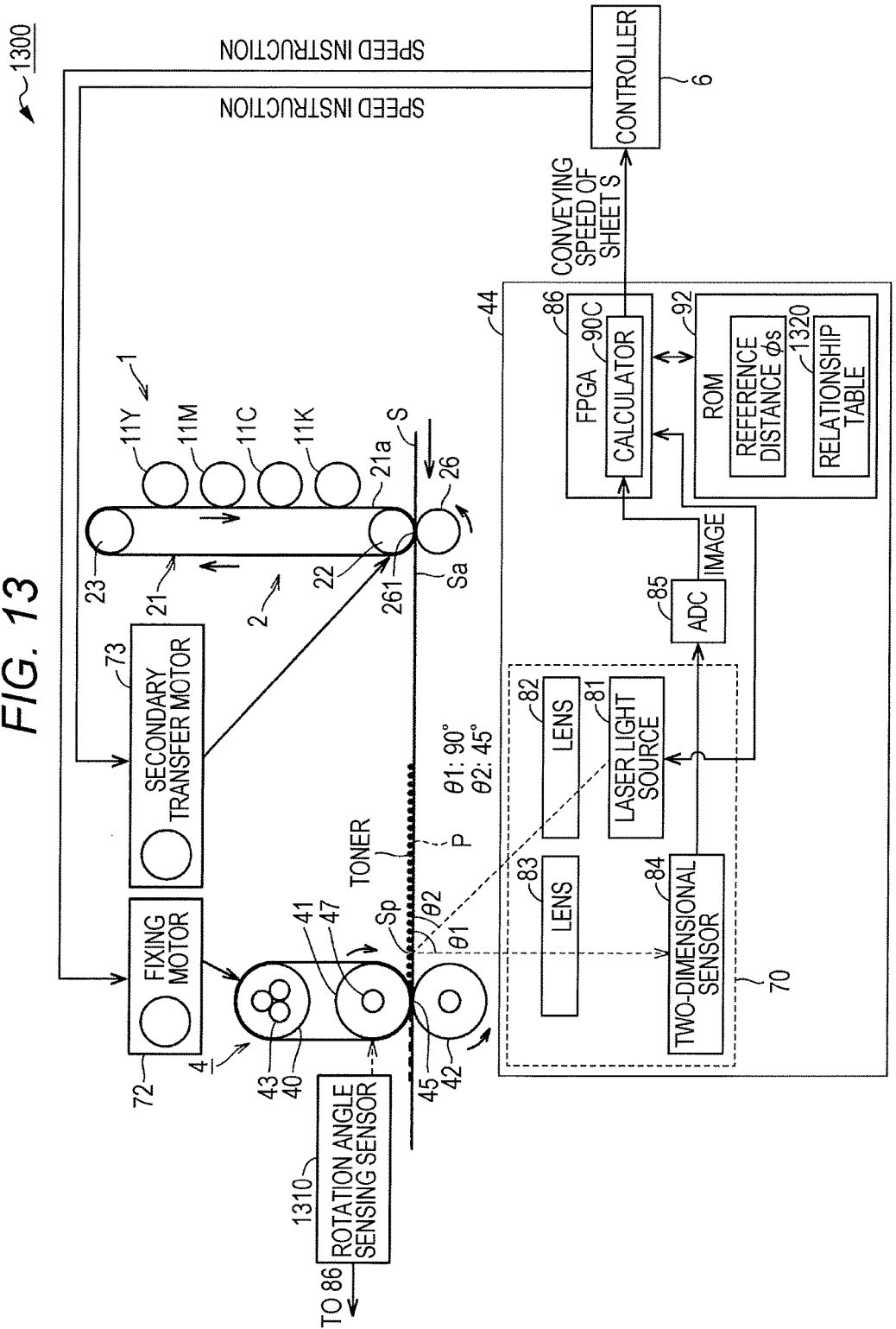
FIG. 13 is a diagram for explaining a configuration example of an image forming apparatus according to a fifth embodiment.

FIG. 13 is a diagram for explaining a configuration example of the image forming apparatus 1300 according to the fifth embodiment. Referring to FIG. 13, the image forming apparatus 1300 differs from the image forming apparatus 100 described with reference to FIG. 3 in that the image forming apparatus 1300 includes a rotation angle sensing sensor 1310 and includes a calculator 90C instead of the calculator 90. The rotation angle sensing sensor 1310 detects the rotation angle of a fixing roller 41. The rotation angle sensing sensor 1310 can be realized by, for example, a Hall sensor. The rotation angle sensing sensor 1310 outputs the detected rotation angle to an FPGA 86.

Furthermore, a relationship table 1320 is additionally saved in a ROM 92 of the image forming apparatus 1300. The relationship table 1320 holds the rotation angle and the correction coefficient in association with each other. In this embodiment, the correction coefficient may be, for example, a ratio of a temporary index distance acquired at the corresponding rotation angle to an average value of temporary index distances acquired while the fixing roller 41 makes one rotation. The temporary index distance is the length in the conveying direction of a speckle pattern included in an image captured at the corresponding rotation angle. The image forming apparatus 1300 according to the fifth embodiment can acquire (update) the relationship table 1320, for example, when the power is turned on.

(Control Structure of Calculator 90C)

Figure 14:
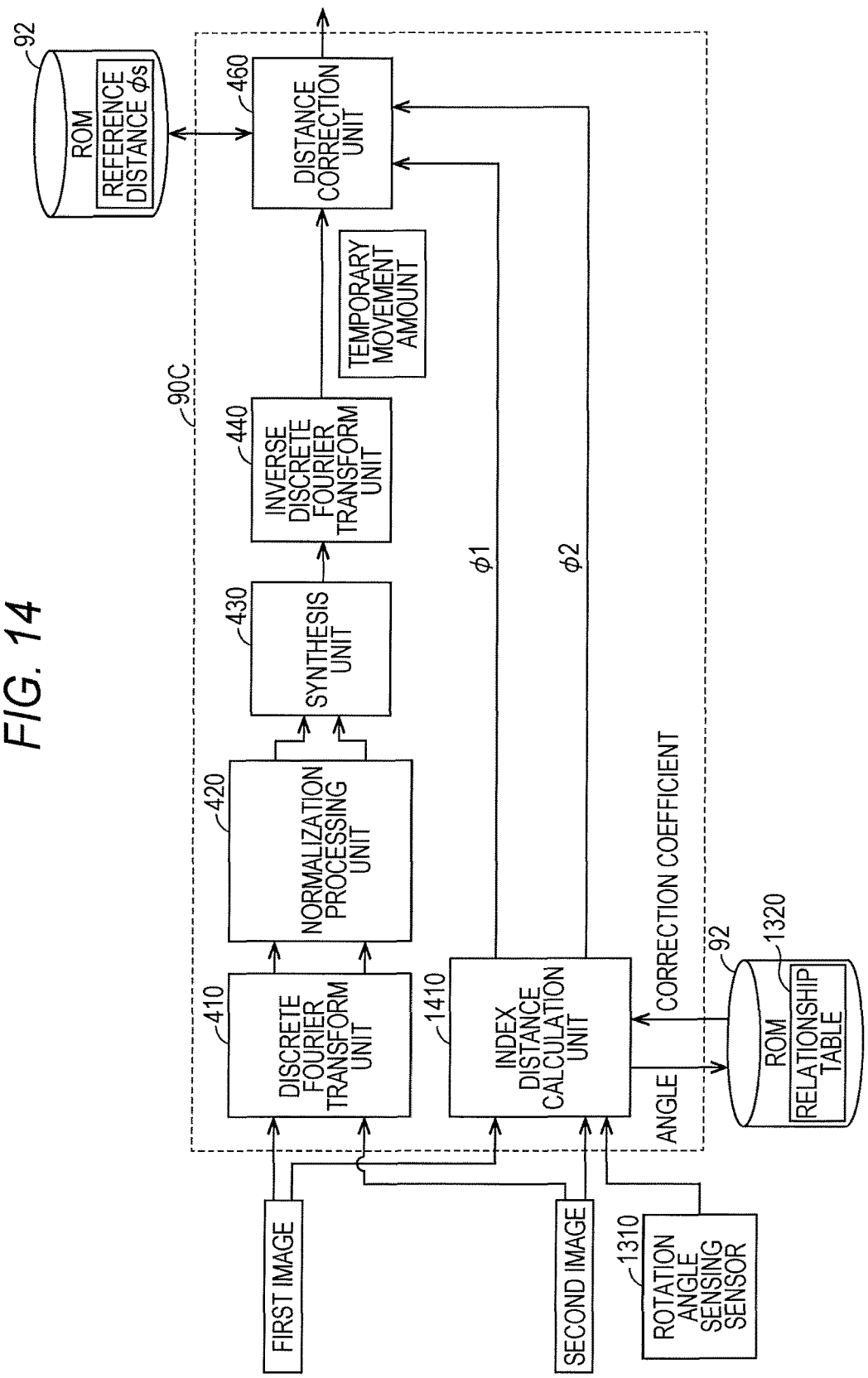
FIG. 14 is a diagram for explaining a control structure of a calculator according to the fifth embodiment.

FIG. 14 is a diagram for explaining a control structure of the calculator 90C according to the fifth embodiment. Note that members denoted by the same reference numerals as those in FIG. 4 are the same and therefore the description thereof will not be repeated.

The calculator 90C differs from the calculator 90 described with reference to FIG. 4 in that the calculator 90C includes an index distance calculation unit 1410 instead of the index distance calculation unit 450.

The index distance calculation unit 1410 calculates the temporary index distance based on the input first image. Furthermore, the index distance calculation unit 1410 accesses the relationship table 1320 to acquire a correction coefficient corresponding to the rotation angle detected by the rotation angle sensing sensor 1310 at the capturing timing of the first image. The index distance calculation unit 1410 multiplies the calculated temporary index distance by the correction coefficient to calculate the index distance $\phi1$ corresponding to the first image. Similarly, the index distance calculation unit 1410 calculates the index distance $\phi2$ corresponding to the second image. The index distance calculation unit 1410 outputs the calculated index distances $\phi1$ and $\phi2$ to a distance correction unit 460.

(Flow of Control for Calculating Conveying Speed—Part 5)

Figure 15:
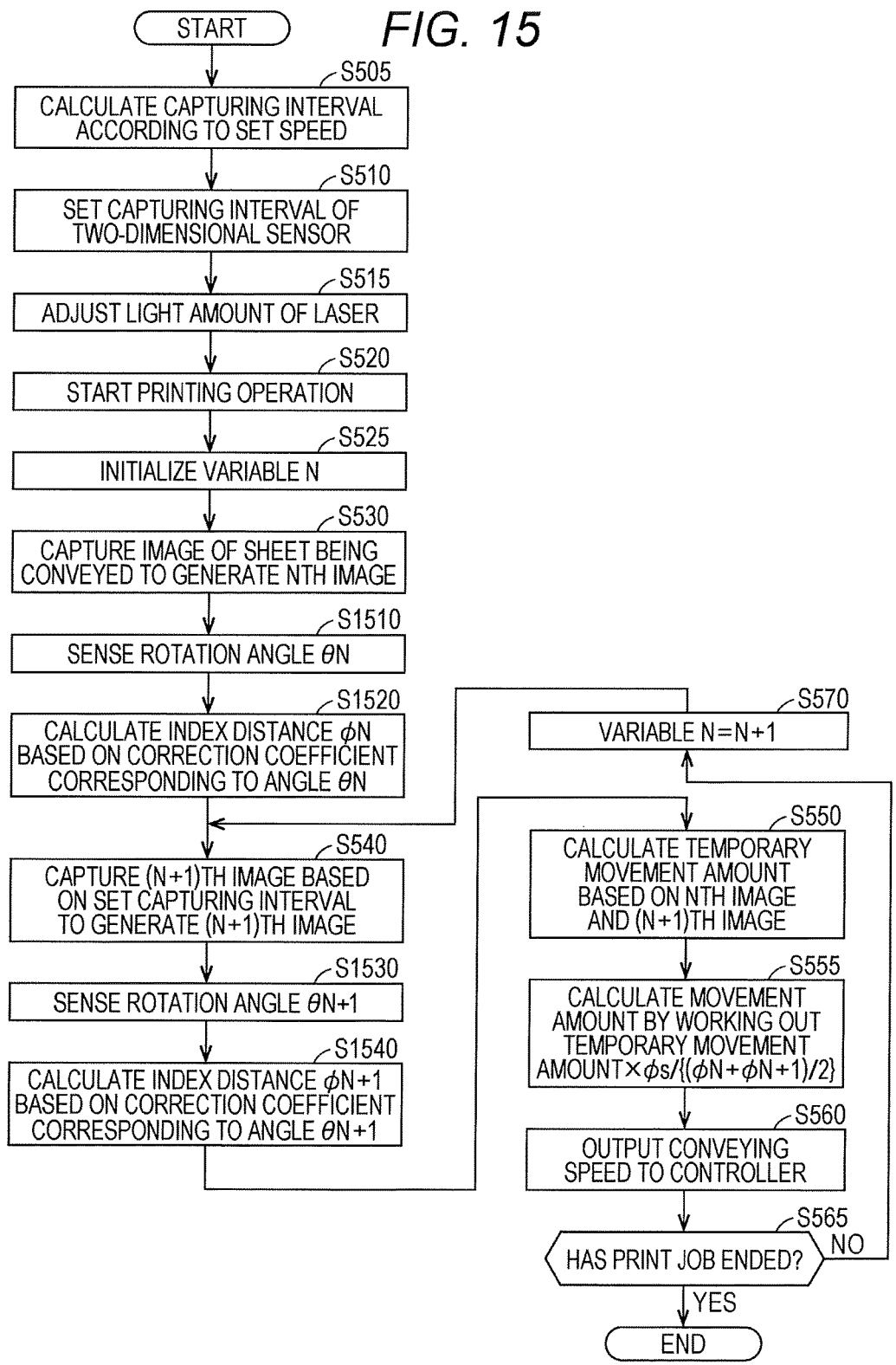
FIG. 15 is a flowchart for explaining control for calculating the conveying speed of the sheet being conveyed, according to the fifth embodiment.

FIG. 15 is a flowchart for explaining control for calculating the conveying speed of the sheet S being conveyed, according to the fifth embodiment. Note that processing denoted by the same reference numerals as those in FIG. 5 is the same processing and therefore the description thereof will not be repeated.

In step S1510, the FPGA 86 detects a rotation angle $\theta N$ at the timing when the Nth image was captured (generated) based on the output of the rotation angle sensing sensor 1310.

In step S1520, the FPGA 86 accesses the relationship table 1320 to acquire a correction coefficient corresponding to the angle $\theta N$. Furthermore, the FPGA 86 calculates the temporary index distance based on the Nth image and multiplies this temporary index distance by the correction coefficient to calculate the index distance $\phi N$ corresponding to the Nth image.

In step S1530, the FPGA 86 detects a rotation angle $\theta N+1$ at the timing when the (N+1)th image was captured (generated) based on the output of the rotation angle sensing sensor 1310.

In step S1540, the FPGA 86 accesses the relationship table 1320 to acquire a correction coefficient corresponding to the angle $\theta N+1$. Furthermore, the FPGA 86 calculates the temporary index distance based on the (N+1)th image and multiplies this temporary index distance by the correction coefficient to calculate the index distance $\phi N+1$ corresponding to the (N+1)th image.

According to the above configuration, the image forming apparatus 1300 according to the fifth embodiment can calculate the movement amount (conveying speed) of the sheet S in consideration of the eccentricity of the roller. Thus, the image forming apparatus according to the fifth embodiment can more precisely calculate the movement amount (conveying speed) of the sheet S than the image forming apparatuses according to the first and second embodiments.

[Other Configurations]

FIG. 16 is a diagram illustrating how a distanced between the sheet S and the lens 83 varies. As described with reference to FIG. 8, the sheet S is affected by the eccentricity of the rollers. Accordingly, as illustrated in FIG. 16, the distance d between the lens 83 serving as an imaging lens and the sheet S can vary. Therefore, in order to avoid changing of the size of the speckle pattern formed on the two-dimensional sensor 84 even if the distance d varies, the lens 83 is preferably a lens having telecentricity.

The above-described various items of processing are assumed to be realized by one FPGA 86 but not limited thereto. These various functions may be implemented in at least one semiconductor integrated circuit such as a processor, at least one application specific integrated circuit (ASIC), at least one digital signal processor (DSP), at least one FPGA, and/or a circuit including circuits having other arithmetic functions.

These circuits can realize the various functions indicated above by reading one or more commands from at least one tangible readable medium.

Such a medium takes the form of a magnetic medium (for example, a hard disk), an optical medium (for example, a compact disc (CD) and a DVD), a volatile memory, a memory of any type of nonvolatile memory, and the like, but is not limited to this form.

The volatile memory may include a dynamic random access memory (DRAM) and a static random access memory (SRAM). The nonvolatile memory may include a ROM and an NVRAM. A semiconductor memory may be part of a semiconductor circuit together with at least one processor.

Although embodiments of the present invention have been described and illustrated in detail, the disclosed embodiments are made for purposes of illustration and example only and not limitation. The scope of the present invention should be interpreted by terms of the appended claims. The scope of the present invention is intended that all modifications within the meaning and scope of the claims and the equivalents thereof are included.

What is claimed is:

1. An image forming apparatus comprising:
    a conveying path on which a recording medium is conveyed;
    an image capturer that includes a light source and radiates light from the light source to capture the recording medium being conveyed at different timings to generate at least two images including a first image and a second image; and
    a movement amount calculator that calculates a movement amount of the recording medium between capturing timings of the first and second images, wherein
    the movement amount calculator:
    calculates an index distance which is a distance in a conveying direction of a pattern formed by reflected light from the recording medium based on at least one image out of the first and second images;
    calculates a ratio between the index distance and a reference distance used for comparison with the index distance; and
    calculates a movement amount of the recording medium between the capturing timings of the first and second images based on the ratio, the first image, and the second image.

2. The image forming apparatus according to claim 1, wherein the light source includes a laser device.

3. The image forming apparatus according to claim 1, wherein
    the movement amount calculator:
    calculates a first distance based on the first image and the second image; and
    corrects the first distance in accordance with the ratio to calculate the movement amount.

4. The image forming apparatus according to claim 1, wherein
    the movement amount calculator:
    corrects the first image and the second image based on the ratio; and
    calculates the movement amount based on the corrected first image and the corrected second image.

5. The image forming apparatus according to claim 1, wherein the movement amount calculator calculates, as the index distance, an average value of distances of the patterns in the conveying direction in a plurality of images captured by the image capturer.

6. The image forming apparatus according to claim 5, further comprising a conveying roller arranged on a downstream side or an upstream side of an irradiation position of the light source in the conveying path, wherein
    the image capturer continuously captures images over at least a rotation cycle of the conveying roller, and
    the movement amount calculator calculates, as the index distance, an average value of distances of the patterns in the conveying direction in the plurality of continuously captured images.

7. The image forming apparatus according to claim 6, wherein the movement amount calculator calculates, as the index distance, an average value of distances of the patterns in the conveying direction in a plurality of images continuously captured over a period of an integral multiple of the rotation cycle of the conveying roller among the plurality of continuously captured images.

8. The image forming apparatus according to claim 1, further comprising:
    a conveying roller arranged on a downstream side or an upstream side of an irradiation position of the light source in the conveying path;
    a sensor that senses a rotation angle of the conveying roller; and
    a storage that stores a relationship between the rotation angle of the conveying roller and a correction coefficient, wherein
    the movement amount calculator corrects a distance in the conveying direction of the pattern based on at least one image out of the first and second images on the basis of a correction coefficient corresponding to the rotation angle of the conveying roller sensed by the sensor at a capturing timing of the at least one image to calculate the index distance.

9. The image forming apparatus according to claim 1, wherein the reference distance is a distance in the conveying direction of the pattern in an image captured by the image capturer in a state where the image capturer and the conveying direction are parallel.

10. The image forming apparatus according to claim 1, wherein the image capturer further comprises an imaging lens having telecentricity.

* * * * *